United States Patent
Mukerjee et al.

(10) Patent No.: US 11,969,713 B2
(45) Date of Patent: Apr. 30, 2024

(54) GRAPHENE-TRANSITION METAL CATALYST FOR HYDROGEN EVOLUTION REACTION

(71) Applicant: Northeastern University, Boston, MA (US)

(72) Inventors: Sanjeev Mukerjee, Mansfield, MA (US); Robert Allen, Peabody, MA (US); Huong Thi Thanh Doan, Worcester, MA (US); Ian Kendrick, Somerville, MA (US)

(73) Assignee: Northeastern University, Boston, MA (US)

( * ) Notice: Subject to any disclaimer, the term of this patent is extended or adjusted under 35 U.S.C. 154(b) by 0 days.

(21) Appl. No.: 17/783,886

(22) PCT Filed: Dec. 21, 2020

(86) PCT No.: PCT/US2020/066489
§ 371 (c)(1),
(2) Date: Jun. 9, 2022

(87) PCT Pub. No.: WO2021/127658
PCT Pub. Date: Jun. 24, 2021

(65) Prior Publication Data
US 2023/0017721 A1    Jan. 19, 2023

Related U.S. Application Data

(60) Provisional application No. 62/950,374, filed on Dec. 19, 2019.

(51) Int. Cl.
*B01J 23/755* (2006.01)
*B01J 21/18* (2006.01)
(Continued)

(52) U.S. Cl.
CPC ............ *B01J 23/755* (2013.01); *B01J 21/18* (2013.01); *B01J 35/0013* (2013.01); *B01J 35/1028* (2013.01); *H01M 8/0656* (2013.01)

(58) Field of Classification Search
CPC ...... B01J 23/755; B01J 21/18; B01J 35/0013; B01J 35/1028; B01J 35/008;
(Continued)

(56) References Cited

U.S. PATENT DOCUMENTS

| 8,611,070 B2 | 12/2013 | Ivanovici et al. |
| 10,137,435 B2 | 11/2018 | Artero et al. |

(Continued)

FOREIGN PATENT DOCUMENTS

| CN | 102784624 A | * 11/2012 | .............. B01J 20/26 |
| CN | 102784624 A | 11/2012 | |

(Continued)

OTHER PUBLICATIONS

Neiva et al., "Graphene/nickel nanoparticles composites from graphenide solutions", Journal of Colloid and Interface Science, 453 (2015) pp. 28-35.
(Continued)

*Primary Examiner* — Patricia L. Hailey
(74) *Attorney, Agent, or Firm* — Verrill Dana, LLP

(57) ABSTRACT

Functionalized catalysts for use in a hydrogen evolution reaction (HER) contain nanoparticles containing a transition metal enveloped in layers of graphene, which renders the nanoparticles resistant to passivation while maintaining an optimal ratio of transition metal and transition metal oxide in the nanoparticles. The catalysts can be utilized with anionic exchange polymer membranes for hydrogen production by alkaline water electrolysis.

28 Claims, 15 Drawing Sheets

(51) Int. Cl.
*B01J 35/00* (2006.01)
*B01J 35/10* (2006.01)
*H01M 8/0656* (2016.01)

(58) Field of Classification Search
CPC ........ B01J 35/0086; B01J 23/10; B01J 23/22;
B01J 23/26; B01J 23/34; B01J 21/063;
B01J 23/06; B01J 23/72; B01J 23/745;
B01J 23/75; C01B 32/184; H01M 8/0656
USPC ....... 502/182, 185, 305, 314–316, 318, 319,
502/320, 324, 329–331, 337, 338, 342,
502/345, 350; 977/773, 778, 810, 811
See application file for complete search history.

(56) References Cited

U.S. PATENT DOCUMENTS

| | | | | |
|---|---|---|---|---|
| 2009/0068470 | A1* | 3/2009 | Choi | G02B 6/032 427/377 |
| 2011/0260119 | A1* | 10/2011 | Zelenay | H01M 4/9083 502/1 |
| 2012/0070764 | A1 | 3/2012 | Chung et al. | |
| 2013/0134361 | A1* | 5/2013 | Lee | C01B 32/186 977/734 |
| 2013/0344413 | A1* | 12/2013 | Kim | H01M 4/923 429/480 |
| 2014/0087939 | A1* | 3/2014 | Kim | B01J 29/072 502/185 |
| 2017/0368535 | A1* | 12/2017 | Chopra | C01B 32/192 |
| 2018/0194630 | A1* | 7/2018 | Cai | B01J 13/02 |

FOREIGN PATENT DOCUMENTS

| | | | | |
|---|---|---|---|---|
| CN | 106654307 | A * | 5/2017 | ............. B82Y 30/00 |
| KR | 101736426 | B1 * | 5/2017 | ............. B01J 23/72 |

OTHER PUBLICATIONS

Fang et al., "Nickel nanoparticles coated with graphene layers as efficient co-catalyst for photocatalytic hydrogen evolution", Applied Catalysis B: Environmental 200 (2017) pp. 578-584.

Ullah et al., "In situ growth of M—MO (M = Ni, Co) in 3D graphene as a competent bifunctional electrocatalyst for OER and HER", Electrochimica Acta, vol. 298, Dec. 10, 2018 (Dec. 10, 2018), pp. 163-171.

Wang et al., "Dominating Role of Nio on the Interface of Ni/NiO for Enhanced Hydrogen Evolution Reaction", Applied Materials & Interfaces, vol. 9, No. 8, Feb. 15, 2017 (Feb. 15, 2017), pp. 7139-7147.

* cited by examiner

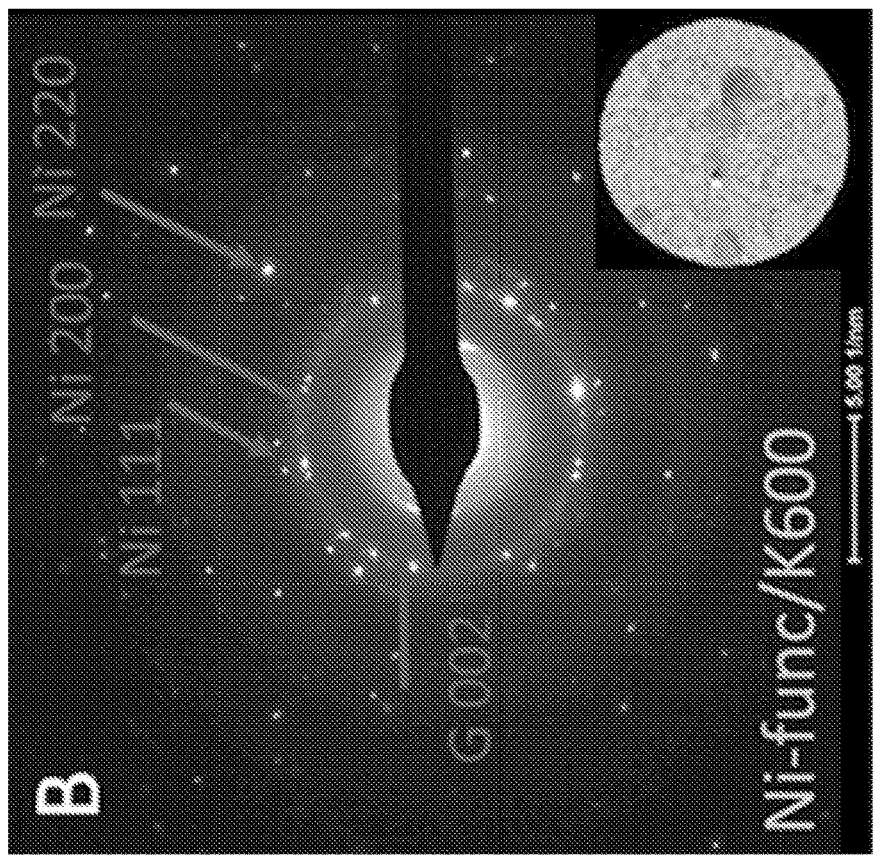
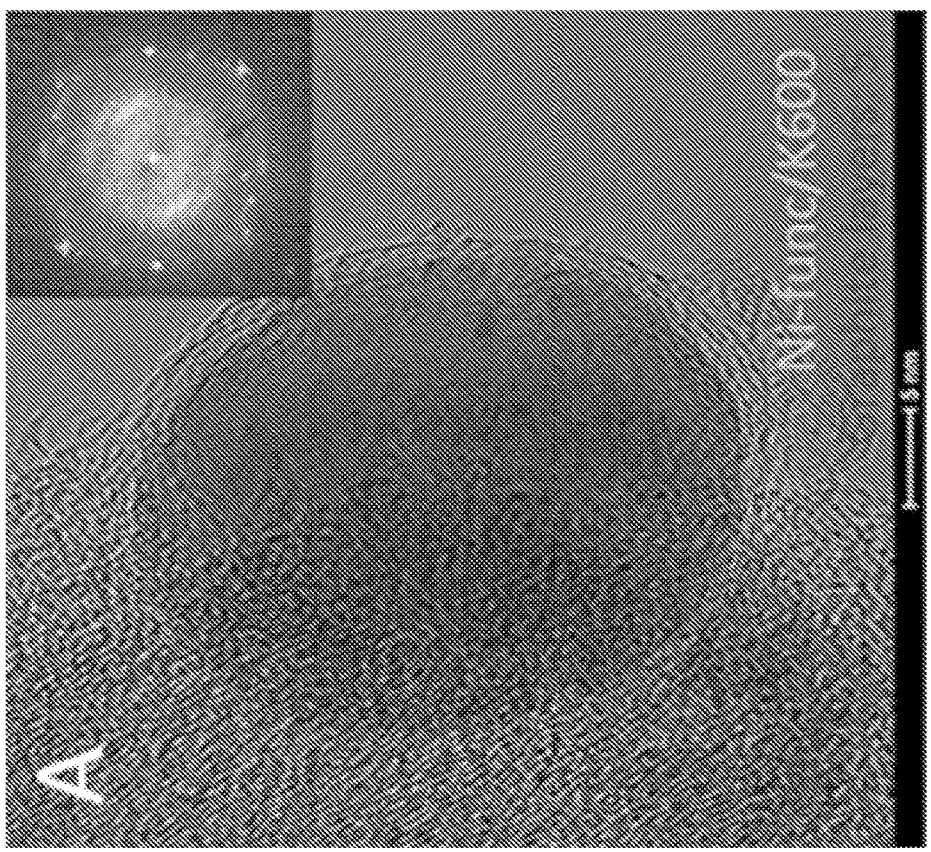
FIG. 6A
FIG. 6B

GRAPHENE-TRANSITION METAL CATALYST FOR HYDROGEN EVOLUTION REACTION

CROSS-REFERENCE TO RELATED APPLICATIONS

This application claims priority to U.S. Provisional Application No. 62/950,374, filed 19 Dec. 2019, which is incorporated by reference herein in its entirety.

STATEMENT REGARDING FEDERALLY SPONSORED RESEARCH OR DEVELOPMENT

This invention was made with government support under Grant Number DE-EE0008082 awarded by the Department of Energy (DOE). The government has certain rights in the invention.

BACKGROUND

The production of hydrogen via water electrolysis can provide a low-carbon means of hydrogen gas production particularly for hydrogen vehicles, long distance transport of energy, and seasonal energy storage. The development of low-cost and reliable catalysts for the oxygen evolution reaction (OER) and the hydrogen evolution reaction (HER) is a key component in achieving the widespread adoption of this technology.

Water electrolysis is a potentially cost effective and carbon neutral means of hydrogen gas production. In the United States, the targeted cost of hydrogen production, as set by the Department of Energy (DOE), is $2/kg by 2020 (EERE, 2012). The development of low-cost and reliable catalysts for the oxygen evolution reaction (OER) and the hydrogen evolution reaction (HER) is a key component in achieving this goal. The relatively recent introduction of anion exchange membranes has allowed for the substitution of cheaper transition metal catalysts for platinum group metals (PGMs) in these reactors (Subbaraman, R, et al., 2012; McKone, J R, et al., 2013; Deng, J, et al., 2014; You, B, et al., 2016; Safizadeh, F, et al., 2015; Jin, H, et al., 2015).

In alkaline media, the HER presents a particular challenge: at higher pH values, the HER is more sluggish because $H^+$ is generated in-situ from the catalytic dissociation of water, (Subbaraman, R, et al., 2011; Danilovic, et al., 2012; Liu, B, et al., 2017), whereas in acidic media $H^+$ is freely available (Wang, J, et al., 2017; Li, X, et al., 2016). The relatively recent introduction of anionic exchange polymer membranes for alkaline water electrolysis has enabled the use of lower-cost metal catalysts in these electrochemical reactors that would otherwise corrode in reactors that use traditional proton exchange membranes. Thus, there is an urgent need for new catalysts for water electrolysis.

SUMMARY

The present technology provides a functionalized monometallic catalyst containing a transition metal, such as Ni, for use in a hydrogen evolution reaction (HER). Among transition metals, nickel has shown high activity towards the HER. However, there are two main drawbacks to using nickel as a HER catalyst: 1) nickel easily oxidizes to the electrochemically inactive nickel oxide, and 2) prolonged use of nickel results in the inactivation of the catalyst through the buildup of hydrides, which poison the catalyst. The present technology optimizes nickel and other transition metals as catalysts for HER to overcome these drawbacks and to provide a low cost catalyst with increased efficiency. Layers of graphene introduced during the synthetic process envelop Ni nanoparticles, making them resistant to passivation while maintaining an optimal ratio of $Ni^0$ to $NiO_x$. The layers of graphene provide a self-healing catalyst. The functionalized transition metal catalyst can be prepared by forming a complex comprising a transition metal ion and a chelating agent in the presence of a carbon support.

Nickel or other transition metals can oxidize under ambient conditions to form oxides; however, the formation of thin layers of graphene around nickel metal particles limits oxidation. In the presence of the graphene layers, a portion of the transition metal can still oxidize. The original amount of transition metal oxide can be re-established by exposure to atmosphere or by cycling the potential to the anode region. Via this mechanism, the transition metal catalyst material is "self-healing", because the oxophilic moieties that confer the material's increased activity are regenerated spontaneously under ambient conditions.

The transition metal-based catalyst is prepared via pyrolysis of a chelated metal salt in the presence of a carbon support. The resulting functionalized metal, such as Ni, contains an optimal ratio of reduced ($M^0$) and oxidized ($MO_x$) forms for catalysis and water adsorption, respectively, without passivating the catalyst. The ratio of $M^0$ to $MO_x$ is maintained due to the protection of $M^0$ sites by several layers of graphene introduced during synthesis. The presence of the graphene layers was confirmed by high resolution transmission electron microscopy, while the material's resistance to passivation was demonstrated by in-situ X-ray absorption studies. The stability and activity of the functionalized Ni catalyst has been demonstrated in half-cell RDE and full-cell hydrogen pump experiments. In the case of the latter, the functionalized Ni surprisingly outperformed a Pt catalyst.

The present technology can be further summarized by the following list of features.

1. A method of making a transition metal catalyst, the method comprising the steps of:
   (a) forming a slurry comprising carbon black particles and an aqueous solution comprising a salt of a transition metal M and an oxygen-containing chelating agent;
   (b) mixing the slurry, whereby the aqueous solution is absorbed by the carbon black particles;
   (c) separating the carbon black particles containing the absorbed solution from the non-absorbed solution;
   (d) drying the separated carbon black particles to obtain a solid product; and
   (e) heating the solid product, whereby a first portion of M is oxidized, a second portion of M is reduced to form nanoparticles comprising $M°$, and a carbon matrix comprising graphene forms and surrounds the nanoparticles to form the catalyst.
2. The method of feature 1, wherein M is a 3d transition metal selected from the group consisting of scandium, titanium, vanadium, chromium, manganese, iron, cobalt, nickel, copper, zinc, and combinations thereof.
3. The method of feature 2, wherein M is nickel.
4. The method of feature 2, wherein the nanoparticles comprise $M:M_yO_x/C$, and wherein y is from 3-9 and $x=(2y-1)$.
5. The method of any of features 1-3, wherein the nanoparticles comprise $M:M_yO_x/C$, and wherein $1 \leq y \leq 3$ and $1 \leq x \leq 5$.

6. The method of any of the preceding features, wherein the oxygen-containing chelating agent is selected from the group consisting of N-nitroso-N-phenylhydroxylamine (cupferron), ethylenediamine-tetraacetic acid, 2,3-dimercaptopropane-1-sulfonate, deferoxamine, nitrilo acetic acid, dimercaprol, meso-2,3-dimercaptosuccinic acid, and combinations thereof.
7. The method of any of the preceding features, wherein the slurry formed in (a) comprises about 40 wt % of M, to which a solution of the oxygen-containing chelating agent is added dropwise.
8. The method of any of the preceding features, wherein the slurry formed in (a) comprises M and the oxygen-containing chelating agent in a 1:2 molar ratio.
9. The method of any of the preceding features, wherein the heating in (e) is performed at about 600° C. to 800° C., such as at about 700° C.
10. The method of any of the preceding features, wherein the heating in (e) is performed for about 1 hour to about 5 hours, such as for about 3 hours.
11. The method of any of the preceding features, wherein the heating of (e) is performed in an inert atmosphere.
12. The method of any of the preceding features, wherein the nanoparticles formed in (e) further comprise an oxidized form of M.
13. The method of feature 12, wherein the nanoparticles formed in (e) comprise reduced and oxidized forms of M at an atomic ratio in the range from about 1:1 to about 1:3.
14. The method of any of the preceding features, wherein the nanoparticles are each surrounded by from 1 to 5 layers of graphene.
15. The method of any of the preceding features, wherein M in the final catalyst is prevented from contacting water when the catalyst is used in an aqueous environment.
16. The method of any of the preceding features, wherein the final catalyst comprises from about 10% to about 70% of M (wt/wt) based on the total weight of the catalyst.
17. The method of any of the preceding features, wherein the carbon black particles comprise microparticles and/or nanoparticles.
18. The method of any of the preceding features, wherein the carbon black particles have a surface area of at least about 1000 m$^2$/g, at least about 1200 m$^2$/g, or at least about 1400 m$^2$/g.
19. The method of any of the preceding features, wherein the method does not comprise use of a reducing agent.
20. A transition metal catalyst made by the method of any of the preceding features.
21. A transition metal catalyst comprising a plurality of nanoparticles, wherein each nanoparticle comprises both reduced and oxidized forms of a transition metal M and is encased in one or more layers of graphene.
22. The transition metal catalyst of feature 21, wherein M is a 3d transition metal selected from the group consisting of scandium, titanium, vanadium, chromium, manganese, iron, cobalt, nickel, copper, zinc, and combinations thereof.
23. The transition metal catalyst of feature 22, wherein M is nickel.
24. The transition metal catalyst of feature 22, wherein the nanoparticles comprise M:M$_y$O$_x$/C, and wherein y is from 3-9 and x=(2y−1).
25. The transition metal catalyst of any feature 22 or 23, wherein the nanoparticles comprise M:M$_y$O$_x$/C, and wherein 1≤y≤3 and 1≤x≤5.
26. The transition metal catalyst of any of features 21-25, wherein the nanoparticles comprise reduced and oxidized forms of M at an atomic ratio in the range from about 1:1 to about 1:3.
27. The transition metal catalyst of feature 26, wherein the atomic ratio of reduced to oxidized forms of M is about 1:2.
28. The transition metal catalyst of any of features 21-27, wherein one or more oxidized forms of M are present at a surface of the nanoparticles.
29. The transition metal catalyst of any of features 21-28, wherein each nanoparticle is encased in one to five layers of graphene.
30. The transition metal catalyst of any of features 21-29, wherein the nanoparticles have an average diameter in the range from about 5 nm to about 50 nm.
31. The transition metal catalyst of any of features 21-30, wherein the catalyst is suitable for catalyzing a hydrogen evolution reaction and/or an oxygen evolution reaction.
32. The transition metal catalyst of any of features 21-31, wherein the catalyst is more stable when used to carry out a hydrogen evolution reaction or an oxygen evolution reaction than a Pt/C or Pt-M/C catalyst.
33. The transition metal catalyst of any of features 21-32, wherein the catalyst provides a higher voltage than a Pt/C catalyst when used in a full cell hydrogen pump.
34. An electrode comprising the transition metal catalyst of any of features 21-33.

The present technology can be applied to 3d transition metals and transition metal salts. Examples of 3d transition metals are iron, cobalt, copper, nickel, and zinc. Examples of "transition metal salts" are metal salts in which the metal ions are transition metal ions, such as metals in the d-block of the periodic table of the elements, including the lanthanide and actinide series. Transition metal salts include, but are not limited to, salts of scandium, titanium, vanadium, chromium, manganese, iron, cobalt, nickel, copper, zinc, yttrium, zirconium, niobium, molybdenum, technetium, ruthenium, rhodium, palladium, silver, cadmium, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, actinium, thorium, protactinium, uranium, neptunium, plutonium, americium, curium, berkelium, californium, einsteinium, fermium, mendelevium, nobelium, and lawrencium. Any salt which has sufficient aqueous solubility for use in the synthesis of the catalyst can be used, such as chlorides, sulfates, and nitrates.

As used herein, the term "about" refers to a range of within plus or minus 10%, 5%, 1%, or 0.5% of the stated value.

As used herein, "consisting essentially of" allows the inclusion of materials or steps that do not materially affect the basic and novel characteristics of the claim. Any recitation herein of the term "comprising", particularly in a description of components of a composition or in a description of elements of a device, can be exchanged with the alternative expression "consisting of" or "consisting essentially of".

BRIEF DESCRIPTION OF THE DRAWINGS

FIG. 6A shows a HR-TEM image of a 30% Ni-functionalized/K600 (Ni-func/K600). FIG. 6B shows SAD patterns of Ni-functionalized/K600 (Ni-func/K600) taken at 100 nm area.

FIG. 9A—Ni/K600. FIG. 9B—Ni—Cr/K600. FIG. 9C—Ni-functionalized/K600. FIG. 9E—Ni—Cr/K600, and FIG. 9F—Ni-functionalized/K600.

DETAILED DESCRIPTION

Figure 1:
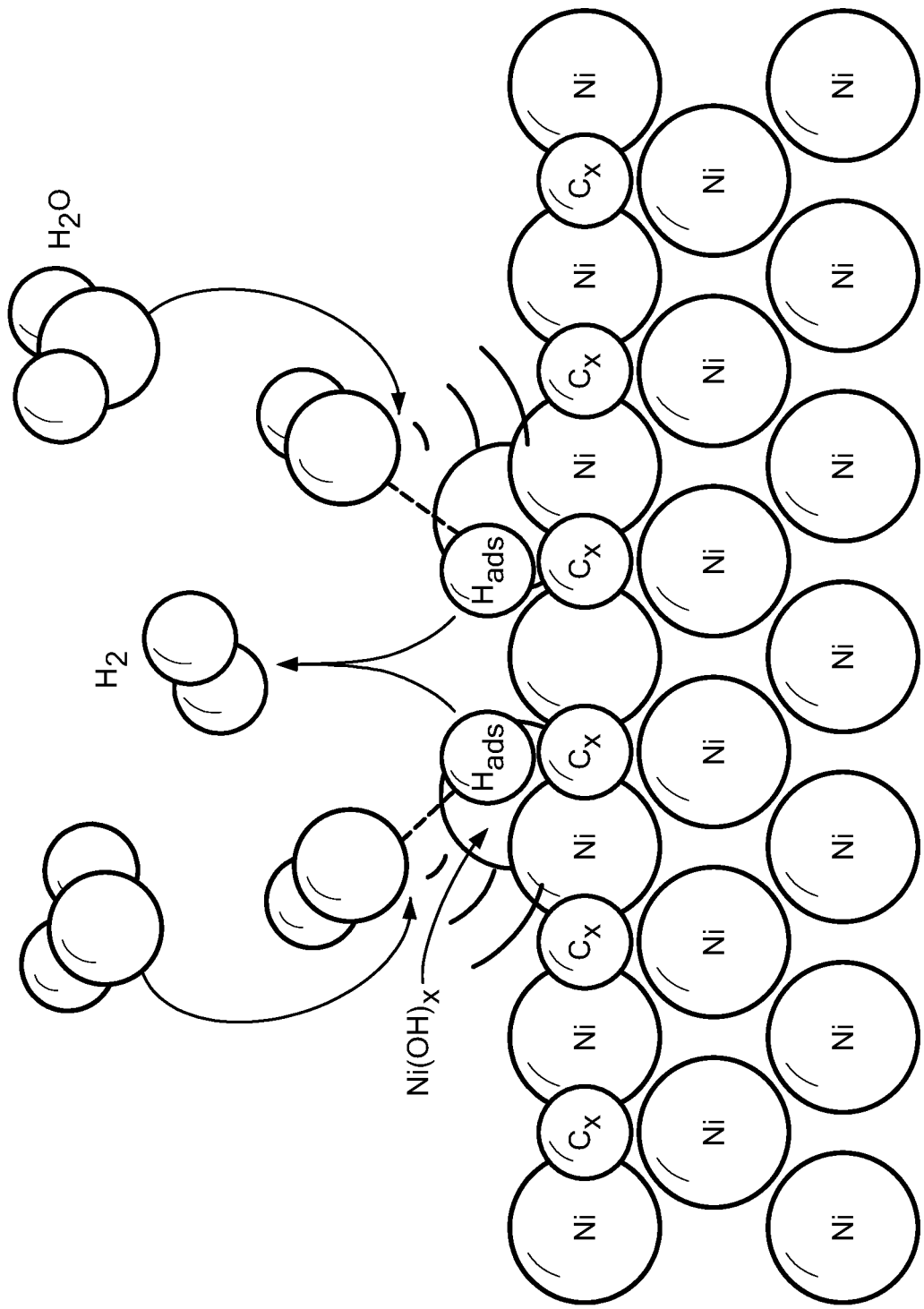
FIG. 1 shows a mono-metallic functionalized HER mechanism (prior art).

The present technology provides a functionalized monometallic transition metal (M)-based catalyst where layers of graphene introduced during the synthetic process envelop the M$^0$ particles making these moieties resistant to passivation while maintaining an optimal ratio of M$^0$ and a transition metal oxide (MOx). For example, if the transition metal is nickel, the layers of graphene introduced during the synthetic process envelop the Ni$^0$ particles making these moieties resistant to passivation while maintaining an optimal ratio of Ni$^0$ and NiO$_x$. Fundamental studies of using rotating disk electrodes (RDE) demonstrate the anodic and cathodic stability of a functionalized Ni catalyst. The efficacy of the Ni catalyst is demonstrated in the practical context of a fuel cell operated in a hydrogen pump configuration that exhibits superior alkaline HER activity and durability in a practical device of H$_2$ pump. These complementary characterizations show that unlike regular Ni, whose surface is susceptible to poisoning through hydride formation, the surface of the functionalized Ni catalyst is fully active for HER.

In alkaline media, there are three steps for HER mechanism (Reactions 1-3, shown below) (Deng, J, et al., 2014; Sheng, W, et al., 2010; Durst, J, et al., 2014; Krstajić, N, et al., 2001). Although there is a debate as to whether the HER mechanism undergoes Volmer-Tafel or Volmer-Heyrovsky, it is generally accepted that the Volmer step occurs first, breaking the water molecule before the hydrogen recombination to form H$_2$. In addition, the side product OH$^-$, needs to be removed from the surface efficiently to complete the Volmer step.

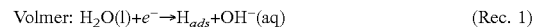

Volmer: $H_2O(l)+e^- \rightarrow H_{ads}+OH^-(aq)$ (Rec. 1)

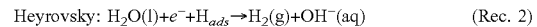

Heyrovsky: $H_2O(l)+e^-+H_{ads} \rightarrow H_2(g)+OH^-(aq)$ (Rec. 2)

Tafel: $H_{ads}+H_{ads} \rightarrow H_2(g)$ (Rec. 3)

Based on Rec. 1, it is ideal to have two active sites that can absorb H$_{ads}$ and OH$_{ads}$, so OH$_{ad}$ can be further released into the bulk forming OH$^-$. Therefore, the HER rate is determined by either water dissociation, H$_{ads}$ removal (Nørskov, J K, et al., 2005; Miles, M H, 1976), or OH removal, depending on which step is the slowest. Hence, a bifunctional or "co-catalyst" mechanism is ideal for optimizing electrocatalyst performance (Subbaraman, R, et al., 2011). Furthermore, the affinity for both H$_{ads}$ and OH$_{ads}$ are equally important. While the need for optimized H$_{ads}$ affinity is apparent (Moretti, et al., 2000), the role of the OH$_{ads}$ site is less clear.

It is essential that the affinity of the catalyst site for OH$_{ads}$ is not too strong, otherwise the turn-over frequency (TOF) of the reaction would decrease as the sites will be blocked by the oxide passivation layer. Lyons et al. have conducted extensive studies of transition metal surfaces in alkaline electrolyte (Lyons, et al., 2008, 2011). The surface described in the reports by Lyons et al. is a non-stoichiometric, oxy-hydroxide network. While detailed radio-labeling ($^{18}$O) studies have not been conducted to examine the dynamics of this complex network, it could be surmised that this surface likely undergoes a dynamic exchange of OH$_{ads}$ with water molecules at the solid-liquid interface. This dynamic regeneration of the OH$_{ads}$ "co-catalyst" can be the key to developing high-performance electrocatalysts for alkaline HER.

One approach to address the "co-catalyst" issue is the introduction of multiple elements to fit the bifunctional mechanism theory (Zhang, L, et al., 2018; Liang, Z, et al., 2017). Yet from the industry point of view, it is preferable to have a good monometallic catalyst prepared using scalable synthesis methods; as opposed to complex co-deposition of metals on expensive carbonaceous material or using high annealing temperature to promote graphitization, phosphidation, sulfidation, or nitridation (Zhang, R, et al., 2017; Zhou, X, et al., 2017; Zhou, Z, et al., 2017).

Nickel, and other 3d transition metals, possess a 3d band spanning the Fermi level which satisfies the Sabatier Principle and therefore make them candidates for HER catalysts in an alkaline environment. Among these metals, Ni shows the highest resistance towards corrosion in an alkaline environment. These properties of Ni result in close affinity for electrons to transfer from adsorption site to proton (Selvaratnam, 1960; Krstajić, N, et al., 2001; Miles, M H, et al., 1976). Furthermore, the proper ratio of Ni—NiO$_x$ is essential to achieve the optimum HER rate at low overpotential. Wang et al. demonstrated the importance of maintaining a 1:2 Ni$^0$:NiO$_x$ ratio in a study describing hybrid Ni-based HER catalysts supported on bamboo-like carbon nanotubes (Wang, J, et al., 2017). The decade of HER activity over time is directly related to a smaller ratio of Ni—NiO$_x$ due to passivation of Ni surface and possible at the nanometer level of the subsurface. The dependence of HER kinetics on Ni—NiO$_x$ ratio is evident in the following mechanisms (Liang, Z, et al., 2017):

Volmer step:

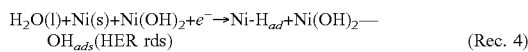

$H_2O(l)+Ni(s)+Ni(OH)_2+e^- \rightarrow Ni-H_{ad}+Ni(OH)_2-OH_{ads}$(HER rds) (Rec. 4)

Tafel step (HER):

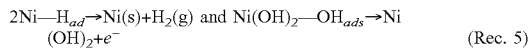

$2Ni-H_{ad} \rightarrow Ni(s)+H_2(g)$ and $Ni(OH)_2-OH_{ads} \rightarrow Ni(OH)_2+e^-$ (Rec. 5)

FIG. 1 shows the advantages of maintaining an optimized ratio of $Ni^0$ and non-conductive $NiO_x$. However, in the case of Ni catalysts prepared from the simple reduction of Ni salts onto a carbon support, there is little to no control over this ratio. In addition, unfavorable amounts of passivating $NiO_x$ are generated under anodic potentials and ambient conditions.

Conventional preparation of nickel catalysts involves the reduction of a nickel precursor salt in the presence of a carbon support. This process can involve the use of a corrosive reducing agent such as sodium borohydride. The functionalized nickel catalysts disclosed herein can be prepared, for example, by forming a complex comprising nickel ions and a chelating agent, for example, cupferron, in the presence of a carbon support. The catalyst can be prepared by adding enough nickel salt to a slurry of the carbon support to create a mixture that is about 40% by weight nickel. A solution of cupferron (2:1 molar ratio with respect to nickel) is added dropwise to the nickel/carbon slurry and allowed to stir at room temperature for about 24-72 hours or about 1-3 days. The mixture is filtered, dried, and heat treated at about 700° C. for about three hours.

During the heat treatment, the following sequential processes occur 1) the nickel ions are converted to nickel oxide, 2) the cupferron decomposes into a brittle polymer in which the nickel oxide particles are embedded, 3) nickel oxide is reduced to nickel metal, and 4) the carbon back-bone is graphitized by the nickel metal. The resulting catalyst has nickel particles embedded in the carbon support, and the nickel particles are covered by several layers of graphene. Electrochemical tests show an improved activity of this catalyst towards HER relative to traditionally prepared nickel on carbon catalysts and a performance that is sustained over a prolonged period of time.

Using the present technology, a monometallic Ni-based catalyst is prepared and is shown to have a higher HER activity and better resistance passivation and hydride deactivation when compared to other types of Ni-based catalysts. The reserve of Ni active sites from the Ni-functionalized/K600 out-performs the highly active Ni—Cr/K600, which originally had the best $M:MO_x$ ratio. The characterization results from XRD, XPS, XAS, HR-TEM, SAD and TGA show that the Ni catalyst is functionalized by multiple layers of graphene. It is these graphene layers which protect Ni from $H_x$ poisoning in cathodic potential as well as passivation in anodic potential.

Furthermore, understanding the role of hydride and hydroxide formation during cathodic or anodic operation can elucidate the HER kinetic mechanisms. The kinetic results can be used to predict different HER behavior in real-life anion exchange membrane cell applications. XPS results were the only validation for Ni/K600 and Ni/functionalized. However, the successful kinetic model was able to provide the surface coverages term from M, $MO_x$ and $H_x$. Most importantly, the development of the kinetic model has led to the faradaic current density and rates expressions (Eq. 1-3). There is no hydride coverage detected from Ni-functionalized/K600 fitting. Moreover, the hydride formation rate $k_{r5}$ from Ni-functionalized/K600 is much slower compared to the other catalysts, due to the protection of graphite layers from $H_x$ poisoning and passivation.

The technology presents a high-performance single metal functionalized surface with better control of the M vs. $MO_x$ ratio from one element, as well as the stability shown in the applicable device ($H_2$ pump). Two major issues can arise when using a non-PGM HER electrocatalyst: The first issue is shut-down-start-up procedure. When not in use, Ni spontaneously passivates its surface which leads to the loss of metallic moieties, thus impeding the kinetics (reaction of nickel to form oxide and hydroxide). The second issue arises from long-term operation under negative potential, which causes both nickel hydroxide and oxide moieties to be reduced into metallic moieties only thus losing the requisite hydroxide co-catalyst active sites, and therefore also impeding the kinetics. Therefore, the use of a non-functionalized catalyst in start-stop systems for on-demand hydrogen production can be considered problematic. The technology shows an outstanding catalyst that is better than the incumbent PGM catalyst (Pt/C), in a practical $H_2$ pump.

Moreover, an anion exchange membrane-$H_2$ pump is introduced for the first time and shows a promising PGM-free catalyst that stable for a long period (3 h of operation at 500 mA cm$^{-2}$). The fact that the Ni-functionalized/K600 still has a metallic component during the anodic study and has oxyphilic moiety during cathodic study can provide a solution to those two major issues in a practical cell.

The methods described herein can be described as methods for direct synthesis of catalysts, can be scaled up, and can be configured as continuous methods. The methods described herein can provide an emerging type of material for electrochemical catalysis designed to be used under alkaline conditions. The catalysts provided herein can be corrosion resistant, self-healing, more cost-effective, and can have higher catalytic activity, while enabling production of hydrogen at scale using low temperature membrane technology operating at alkaline pH with earth sustainable materials such as Ni instead of scarce noble metals.

EXAMPLES

Example 1: Catalyst Syntheses

Ni/K600 was prepared at 30% Ni metal on carbon black support (Ketjen Black-EC600JD, Akzo Nobel Polymer Chemicals) and was synthesized using a standard reduction method. Briefly, carbon black was dispersed in 18.2 MΩ $H_2O$ (Millipore) and stirred overnight. The appropriate amount of $NiCl_2.6H_2O$ was dissolved in 10 mL $H_2O$ and was added to the carbon dispersion, and the reaction mixture was stirred in an ice bath for one hour under a constant stream of nitrogen. 3 molar equivalents (with respect to the metal) of the sodium borohydride ($NaBH_4$) reducing agent solution (Sigma Aldrich) were added dropwise to the reaction mixture which remained in an ice bath for the remainder of the process. Once the exothermic reaction had completed, the mixture was vacuum filtered, washed three times with $H_2O$ and dried overnight at 80° C. under reduced pressure. The catalyst was heat treated for at 700° C. for 3 hours in argon.

Ni—Cr/K600 was prepared using the method described by Bates, M K, et al., 2015. Briefly, K600 was dispersed in water followed by enough $NiCl_2.6H_2O$ and $Cr(NO_3)_3.9H_2O$ (reagent grade, Sigma-Aldrich) to create a 1:1 ratio of Ni:Cr and a 60% wt. metal loading on the carbon support. The reaction mixture was stirred in an ice bath under a constant stream of nitrogen for one hour. 10 mL of freshly prepared NaBH$_4$ solution (3 molar excess with respect to the metals) was added dropwise and the mixture was stirred for another to ensure the reaction reached completion. The solid was subjected to the same workup as described above (filtered, dried, etc.) and heat treated at 500° C. for 6 hours in a 5% H$_2$/95% Ar atmosphere to fully anneal the alloy.

Figure 2:
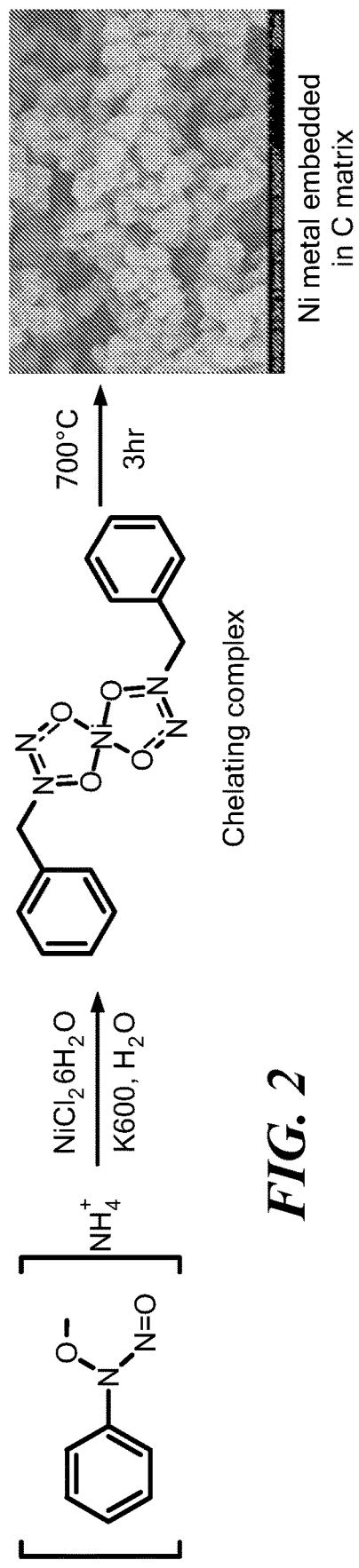
FIG. 2 shows an example of chelation and heat treatment steps of a catalyst synthetic method.

Ni-functionalized/K600 was prepared via the chelation of Ni$^{2+}$ with cupferron in the presence of the K600 carbon support. 150 mg K600 was added to 20 mL of 18.2 MΩ H$_2$O and stirred overnight. The appropriate amount of NiCl$_2$.6H$_2$O and enough cupferron to create a 1:2 ratio of Ni$^{2+}$ to cupferron were dissolved in separate vessels. The solutions of NiCl$_2$.6H$_2$O and cupferron were concurrently added to the dispersion of K600 and the mixture was stirred for 48 hours. Excess solvent was removed with vacuum filtration and the product was dried overnight under reduced pressure at 80° C. The complex was heat treated at 700° C. in Ar for three hours to yield the catalyst. FIG. 2 depicts an example of the chelating process and heat-treatment method. The Ni$^{2+}$-cupferron complex was also prepared without carbon support or heat treatment for characterization purposes.

Example 2: Electrochemical Measurements

Figure 3:
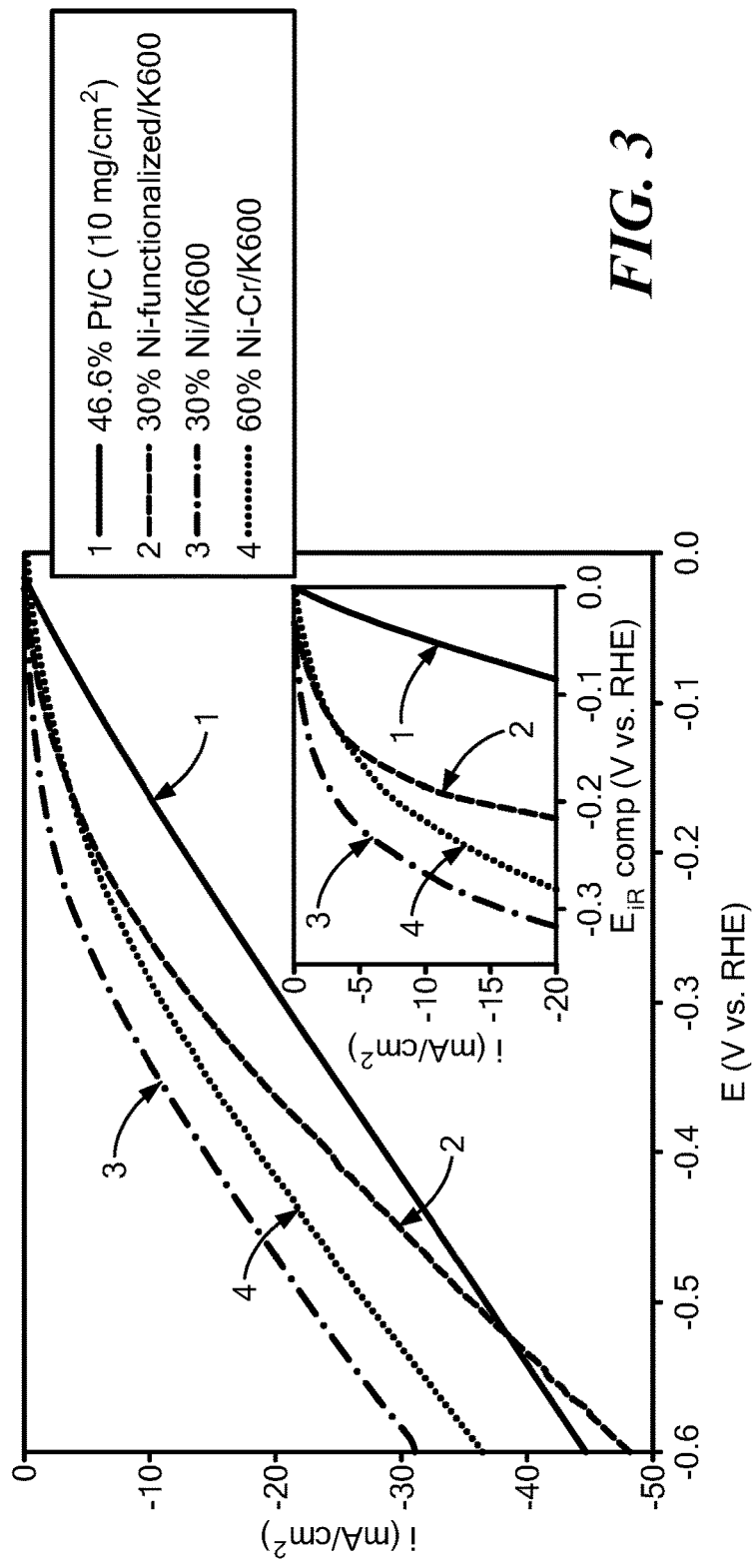
FIG. 3 shows HER comparison for Pt/C (LD: 10 μg metal cm$^{-2}$) vs. non-PGM (LD: 50 μg metal cm$^{-2}$) from 0 V to −0.6 V$_{RHE}$ in H$_2$.

The three catalysts prepared in Example 1: Ni/K600, Ni—Cr/K600, and Ni-functionalized/K600 were studied as representative examples of non-functionalized, bifunctional mixed metal oxide (MMO$_x$), and functionalized monometallic catalysts, respectively. FIG. 3 compares the polarization curves of these three catalysts to that of Pt/C in the HER region (0 to −0.6 V$_{RHE}$ in H$_2$). In FIG. 3, the Pt/C was LD of 10 μg metal cm$^{-2}$ vs. non-PGM was at LD: 50 μg metal cm$^{-2}$.

Although the Pt/C shows superior HER activity in alkaline pH, the non-PGM group catalysts show promising activity, especially the Ni-functionalized/K600. As predicted by the proposed bifunctional mechanism, the trend of HER performance was: Ni-functionalized >Ni—Cr>Ni. The ratio of Ni$^0$ and NiO$_x$ of Ni-functionalized/K600 was the best ratio for HER mechanisms.

Figure 4A:
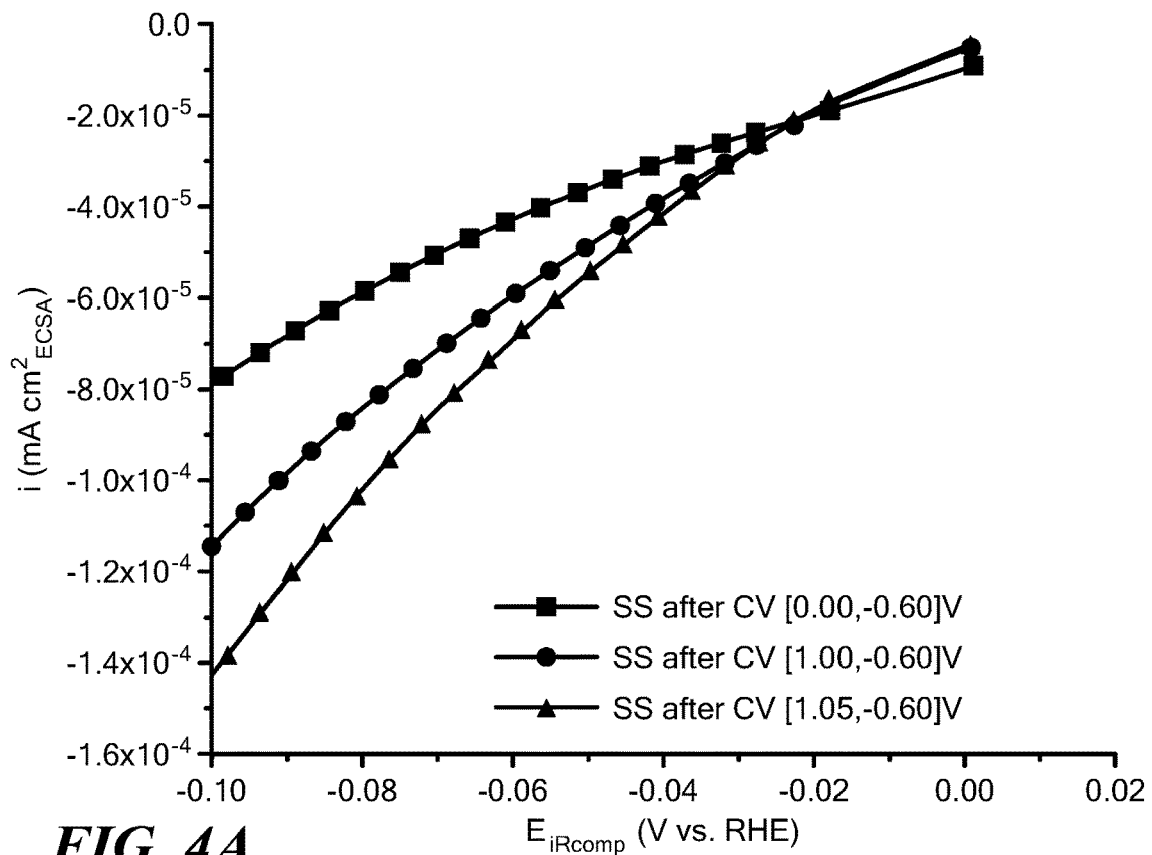
FIGS. 4A-4C show a steady-state comparison after various upper anodic limit CV for Ni-functionalized/K600 (FIG. 4A), Ni/K600 (FIG. 4B) and Ni—Cr/K600 (FIG. 4C). Conditions: 0.1M KOH, 50° C., H$_2$ purged, 2500 rpm.
Figure 4B:
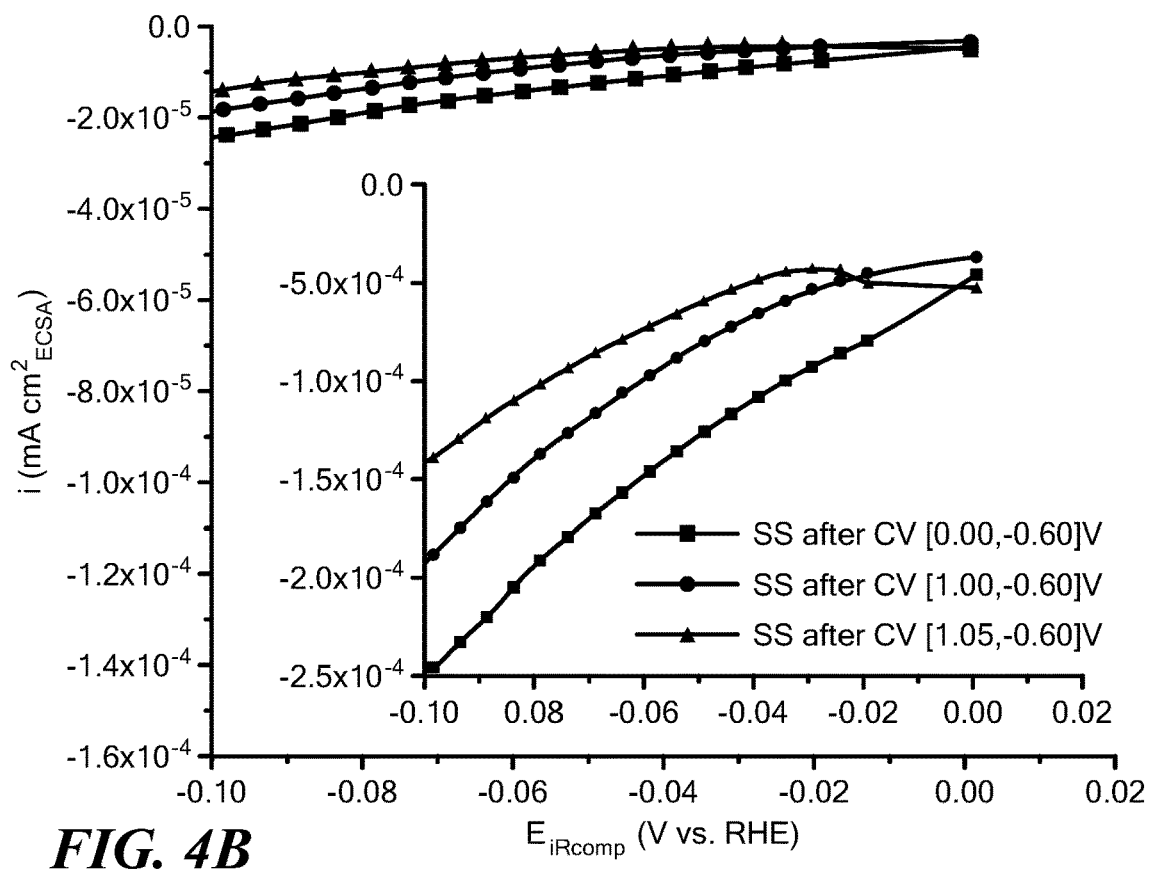
Figure 4C:
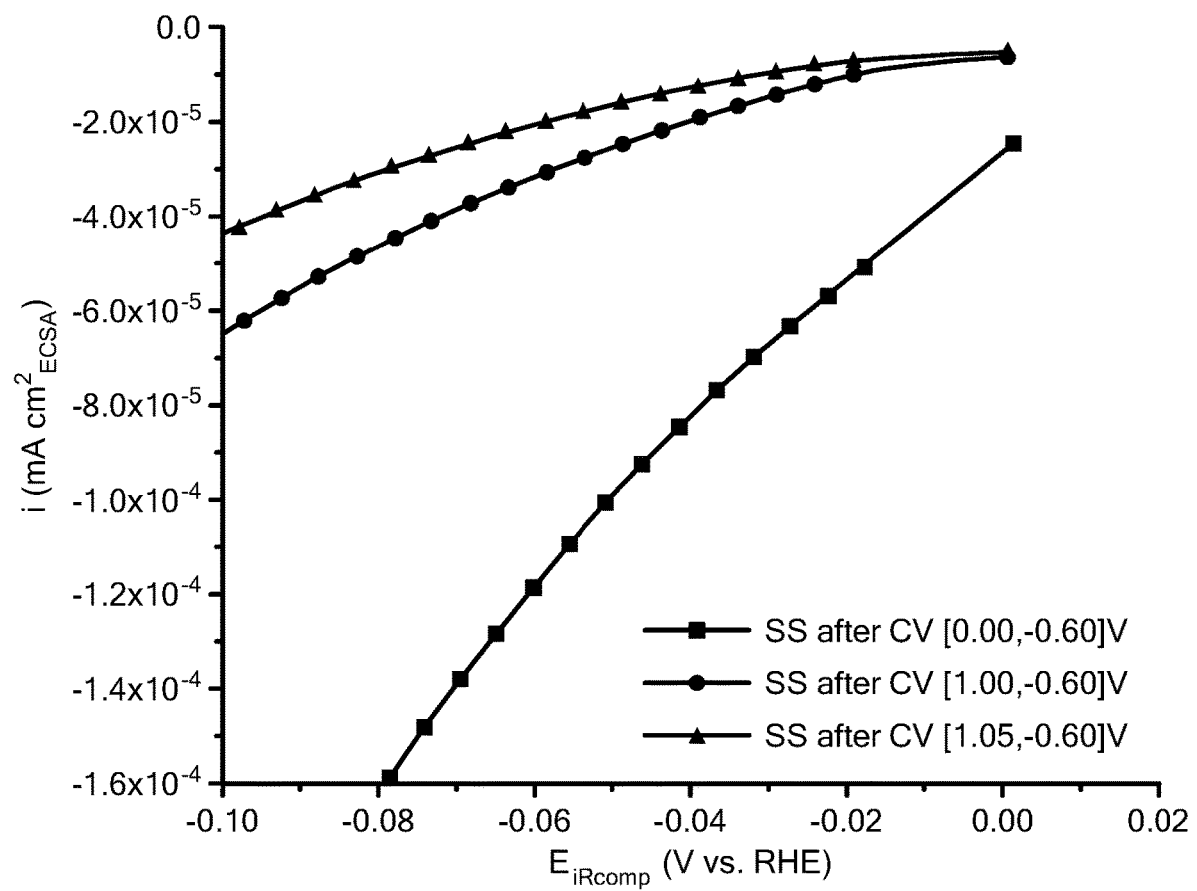

A study of the anodic upper limit study was conducted to provide a comparison of passivation activity among the three classes of catalysts. FIGS. 4A-4C show a steady-state comparison after various upper anodic limit CV for Ni-functionalized/K600 (FIG. 4A), Ni/K600 (FIG. 4B) and Ni—Cr/K600 (FIG. 4C). The conditions were: 0.1 M KOH, 50° C., H$_2$ purged, 2500 rpm. An anodic study may seem unnecessary in the development of HER catalysts which, obviously, generally operate in negative potentials. However, in the practical context of an anionic electrolysis cell, potentials can switch polarization during start-up and shut-down exposing the HER catalyst to anionic potentials. Moreover, various studies of optimizing the Ni:NiO$_x$ (or M:MO$_x$) ratio have shown the importance of balancing these two reactants for HER mechanisms (Liang, Z, et al., 2017). As mentioned previously, protecting the metallic Ni from passivation would maintain a steady cathodic current, i.e. stable HER performance.

FIG. 4A shows that cycling Ni-functionalized/K600 to higher anodic potentials yields better HER performance, which is mostly likely due to the formation of an optimal ratio of NiO$_x$ and Ni$^0$. The trend of Ni-functionalized/K600's HER activity increases when the anodic upper limits increases to 1.05 V$_{RHE}$, relative to lower upper limits. The lower HER performance of the catalyst obtained without anionic conditioning demonstrates that the Ni-functionalized/K600 initially had more Ni$^0$ than NiO$_x$. It should be noted that the HER activity of the Ni-functionalized/K600 decreased when the potential was cycled to 1.1 V$_{RHE}$. This decrease in performance could have been caused by an unfavorable ratio of Ni:NiO$_x$ ratio where the presence of the passivating species begins to hinder catalytic activity or a corrosion of the carbon support. Ni/K600 and Ni—Cr/K600 have the opposite trend compared to Ni-functionalized/K600 because they lack protection against passivation in the anodic region.

Figure 5A:
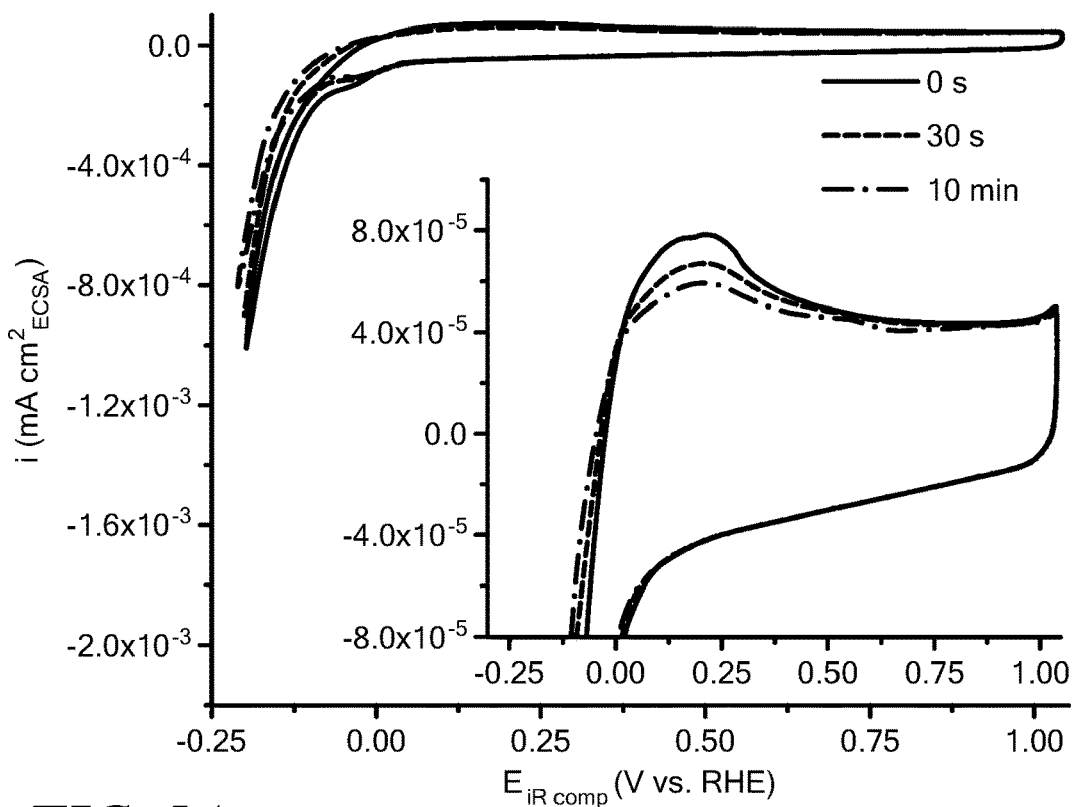
FIGS. 5A-5C show cathodic stability studies @-0.3 V$_{RHE}$ (before iR comp) of Ni-functionalized/K600 (FIG. 5A), Ni/K600 (FIG. 5B), and Ni—Cr/K600 (FIG. 5C). HER activity plots are taken from the CVs, (0 V$_{RHE}$ to −0.3 V$_{RHE}$), which are shown in each of the insets of FIGS. 5A-5C. Insets show a complete CV, to focus on the Ni/NiO$_x$ redox peaks. Conditions: 0.1M KOH, 50° C., H$_2$ purged, 2500 rpm.
Figure 5B:
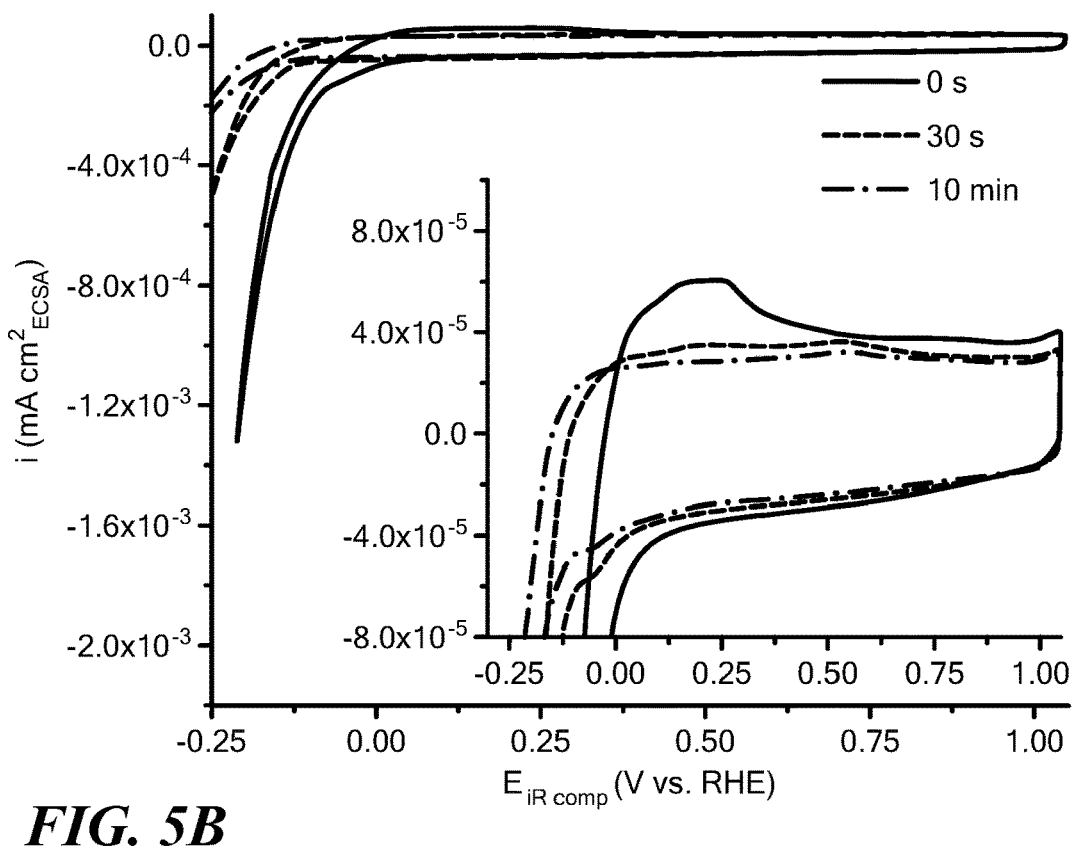
Figure 5C:
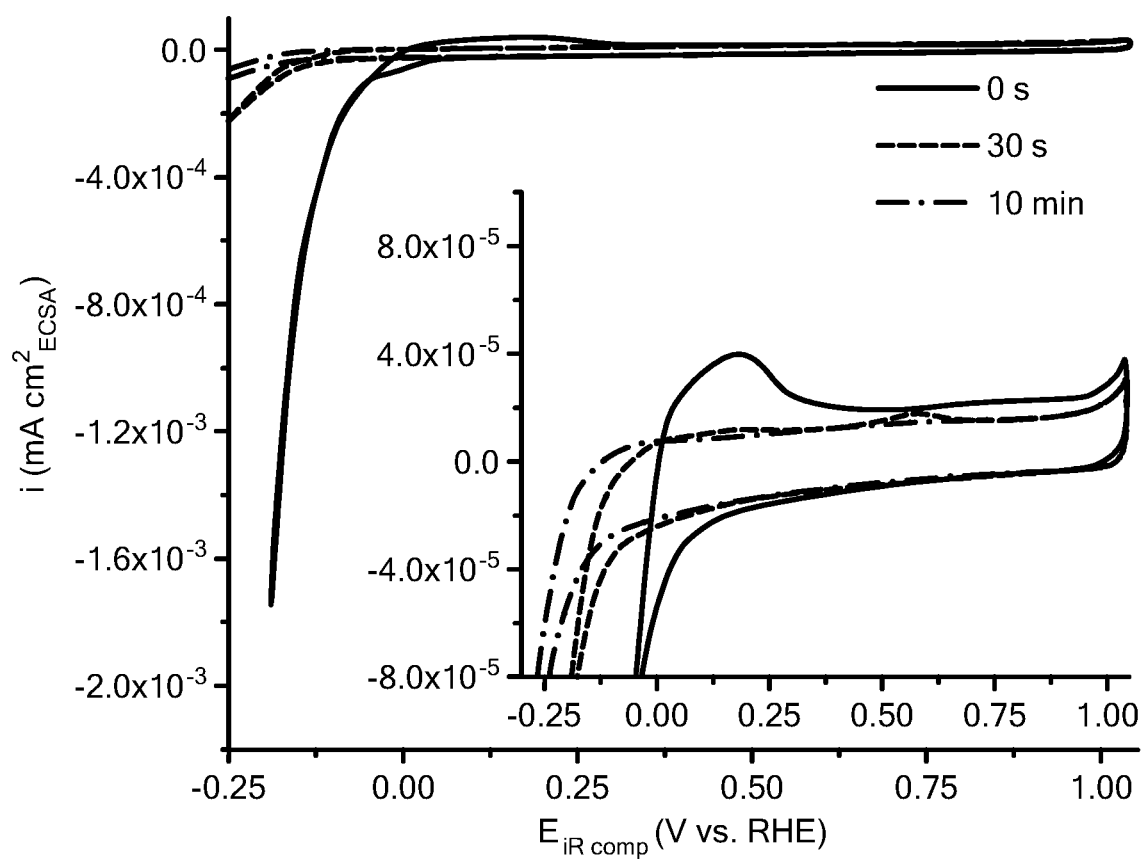

The catalysts were tested for cathodic stability at −0.3 V$_{RHE}$ for various holding times. FIGS. 5A-5C show the cathodic stability studies @−0.3 V$_{RHE}$ (before iR comp) of Ni-functionalized/K600 (FIG. 5A), Ni/K600 (FIG. 5B), and Ni—Cr/K600 (FIG. 5C). HER activity plots are taken from the CVs, (0 V$_{RHE}$ to −0.3 V$_{RHE}$), which are shown in the insets of FIGS. 5A-5C. The insets each show a complete CV, to focus on the Ni/NiO$_x$ redox peaks. The conditions were: 0.1M KOH, 50° C., H$_2$ purged, 2500 rpm.

The Ni-functionalized/K600 (FIG. 5A) was stable in the cathodic region within 10 scans while the HER activity of both Ni/K600 (FIG. 5B) and Ni—Cr/K600 (FIG. 5C) degraded drastically within a couple of cycles. By going to a more cathodic potential (−0.6 V$_{RHE}$), more Ni hydride (Ni—H$_x$) was formed. The hydride formation was a sum of two reactions: Ni—H$_x$-1: metallic Ni and H$_{ads}$ intermediate during HER mechanism (Ni—H$_{ads}$ formed from water breaking step, then they were consumed for the Tafel step in Rec. 4 and Rec. 5 above) and Ni—H$_x$-2: metallic Ni can also react with hydrogen dissolved in the electrolyte (Selvaratnam, 1960). Based on evidence from Ni-hydride studies dated back to 1960s (Selvaratnam), Hall et al. used modern characterizations to prove further that the formation of hydride in the Ni lattice could change the density of states of Ni and thus decreased the HER activity (Hall, D S, et al., 2013).

Further studies (not shown) measured the sensitivity of the HER activity of the Ni/K600 to a H$_2$ environment compared to an Ar environment, i.e., rapid HER degradation and passivation in H$_2$ vs. Ar environment. In contrast, the Ni-functionalized/K600 showed similar surface properties in Ar and H$_2$, suggesting that the Ni surface was not sensitive to the reaction Ni—H$_x$-2. Throughout this disclosure, all the RDE studies were done under H$_2$ environment to mimic the practical cell anion exchange membrane operation, where a large amount of H$_2$ gas will form continuously on the anion exchange membrane-catalyst layer interface.

The insets of FIGS. 5A-5C present the CVs that illustrate the anodic vs. cathodic behavior of Ni/K600 vs. Ni-functionalized/K600 initially without −0.3 V$_{RHE}$—hold (0 s) and various holding times (30 s, and 10 m). The performance at the 9th scan was noted as it was the most stable after the cathodic hold. According to Hall et al., the longer the hold time, the more H$_x$ was formed and the more Ni—H$_x$ will form in the Ni bulk, i.e., HER activity after 10 m hold will be the lowest.

Ni/K600 and Ni—Cr/K600 suffered hydride alteration in the Ni bulk and changed the Ni—Cr/K600's performance from being the best initially (i.e., the best M:MO$_x$ ratio) to the worst after cycling and holding past 10 minutes. Moreover, cycling all the materials up to 1.05 V$_{RHE}$ can passivate the Ni surface as shown in FIGS. 4A-4C. Although the Ni particles of Ni/K600 do not have a modified surface, or have a CrO$_x$ shell, the Ni/K600 HER degradation happened much slower compared to Ni—Cr/K600. The drastic degradation from Ni—Cr/K600 could be because of the low Ni loading. Although the current was normalized to area per Ni electrochemical surface area, which showed the true initial current performance per active sites, the rate of degradation depends on how much material is there. Therefore, Ni at 50 µg/cm² loading (30% Ni/K600 and 30% Ni-functionalized/K600) would have a slower HER degradation, from $H_x$ poisoning and passivation, than Ni at 25 µg/cm² (60% Ni—Cr (1:1)/K600). In contrast, the Ni-functionalized/K600 had a modified Ni surface to protect Ni from $H_x$ poisoning and passivation, thus providing the superior HER activity. Evidence of protection for the Ni-functionalized/K600 was further shown during subsequent characterization of the catalysts.

Electrochemical measurements were conducted using an Autolab potentiostat/galvanostat (PGSTAT30, MetrOhm). All RDE experiments were conducted in a 3-electrode configuration using a fluorinated ethylene propylene (FEP) cell with a 50° C. solution 0.1 M KOH (semiconductor grade 99.99% metal trace, Sigma Aldrich) as an electrolyte. A gold flag was used as a counter electrode and all potentials were measured against a reversible hydrogen electrode (RHE). Inks composed of 0.6 mL $H_2O$, 1.39 mL 2-propanol, 10 µL of Nafion dispersion (5% wt., Alfa Aesar) and an appropriate amount of catalyst were drop-casted onto a 0.247 cm² glassy carbon electrode. 10 µg cm$^{-2}$ and 50 µg cm$^{-2}$ were the target metal loadings of Pt/C and Ni-based catalysts, respectively. The electrolyte was purged with Ar and catalysts were conditioned prior to acquisition of electrochemical data by cycling the potential from 0.05 $V_{RHE}$ to 1.05 $V_{RHE}$ ten times. Unless otherwise stated, RDE measurements were acquired with a scan rate of 50 mV s$^{-1}$ with the working electrode rotating at a rate of 2500 rpm. Current density for Ni-based catalysts were normalized to A cm$^{-2}{}_{Ni}$ based on the available Ni active sites taken from 0.03 $V_{RHE}$ to 0.35 $V_{RHE}$. All potentials reported were corrected for uncompensated resistance.

The anodic stability of each catalyst was assessed after anodic and cathodic conditioning. After conditioning in Ar gas, the solution was purged with $H_2$ gas, and three different upper limits (0 $V_{RHE}$, 1.00 $V_{RHE}$, and 1.05 $V_{RHE}$) were obtained. After an initial sweep from OCP (open circuit potential, for example, typically +0.02 $V_{RHE}$) to 0 $V_{RHE}$, the potential was cycled ten times either from 0 $V_{RHE}$ to $-0.60$ $V_{RHE}$, $-0.60$ $V_{RHE}$ to 1.00, or $-0.60$ $V_{RHE}$ to 1.05 $V_{RHE}$. Chronoamperometry was taken from OCP to 0 $V_{RHE}$ to $-0.02$ $V_{RHE}$ to $-0.20$ $V_{RHE}$ in increments of 5 mV increment/step immediately after each CV.

The cathodic stability of the catalysts was also tested after the electrolyte was purged with $H_2$ gas. The potential was cycled from OCP to $-0.3$ $V_{RHE}$ to 1.05 $V_{RHE}$ for a total of 9 complete scans. After the 9$^{th}$ scan, the potential was brought to $-0.3$ $V_{RHE}$ and held for 30 s after that, the potential was cycled from $-0.3$ $V_{RHE}$ to 1.05 $V_{RHE}$ 9 times. This procedure was repeated with a 10 minutes hold at $-0.3$ $V_{RHE}$.

Hydrogen pump experiments were obtained using 5 cm² gas diffusion electrodes (GDEs) hot pressed to a novel polyaryl piperdinyl-based anion exchange membrane (AEM) (University of Delaware). Catalyst inks were prepared with a targeted metal loading of 3 mg/cm². Isopropanol and water (1:1) were added to the catalyst yield a 3% wt. solution with respect to the total mass of catalyst. Finally, a solubilized form of the ionomer (25% wt. with respect to the catalyst) was added to the ink and sonicated for one hour. In each experiment, Pt/C (47.2%, Tanaka) was used as an HOR catalyst, with one of the Ni-based HER catalysts. All hydrogen pump experiments were conducted at 60° C. with humidified $H_2$ flowing across the anode and humidified $N_2$ flowing across the cathode.

Example 3: Catalyst Characterization

Cupferron was selected as a chelating agent in this study because of its ability to form complexes with nickel in aqueous solutions under mild conditions. Cupferron has been extensively used for chelation-based extraction of trace metals and its complexes have been characterized, however this is the first instance where it has been used for the preparation of electrocatalysts (Liu, H, et al., 2002). In an inert atmosphere, metal-organic complexes such as $Ni(Cup)_2.2H_2O$ thermally decompose to form metal or metal oxide particles dispersed in amorphous carbon. The structure and composition of the metal-organic complex as well as the heat treatment process determine the structure and composition of the final products, and a thorough mechanistic understanding of the decomposition reactions is essential to further improve the performance of this class of catalysts. The decomposition mechanism generally involves: (1) rupture of metal-ligand bonds to nucleate nanoparticles; (2) particle growth via catalytic reaction at particle surface; (3) carbonization of organic residues and reduction of metal oxides.

The general decomposition process of $Ni(Cup)_2.2H_2O$ was characterized by TGA/DSC analysis combined with SEM/EDS and XRD. First, dehydration of the complex occurs at ≈100° C. forming the anhydrous complex followed by the melting of the complex at =200° C. Based on Bottei and Schneggenburger, the cupferron decomposed to NO, $NO_2$ gases a little before 200° C. and resulted in forming NiO (Bottei, R S, et al., 1970). Carbonization of the carbon residues begins at ≈400° C. and the NiO is reduced to Ni⁰. Above 650° C., Ni has the ability to graphitize the carbon backbone (Su, P, et al., 2013; Tominaka, S, et al., 2016). The chelation and decomposition processes are summarized in FIG. 2.

XRD patterns of both Ni functionalized, and non-functionalized on carbon showed one phase of Ni metallic (Ni⁰) having a similar crystallite size of about 11 nm which matches TEM images showing an average particle size range was 10-12 nm. SEM images show high surface area nano-materials imbedded on carbon for both catalysts (FIG. 6A, FIG. 6C). The overall Ni loading of the Ni-functionalized was determined by ICP-OES and corroborated with TGA and EDS. A systematic approach was used to optimize catalyst synthesis (e.g. metal loading, heat treatment time, etc.). Evidence of protection for the Ni-functionalized/K600 was found during characterization.

Figure 6D:
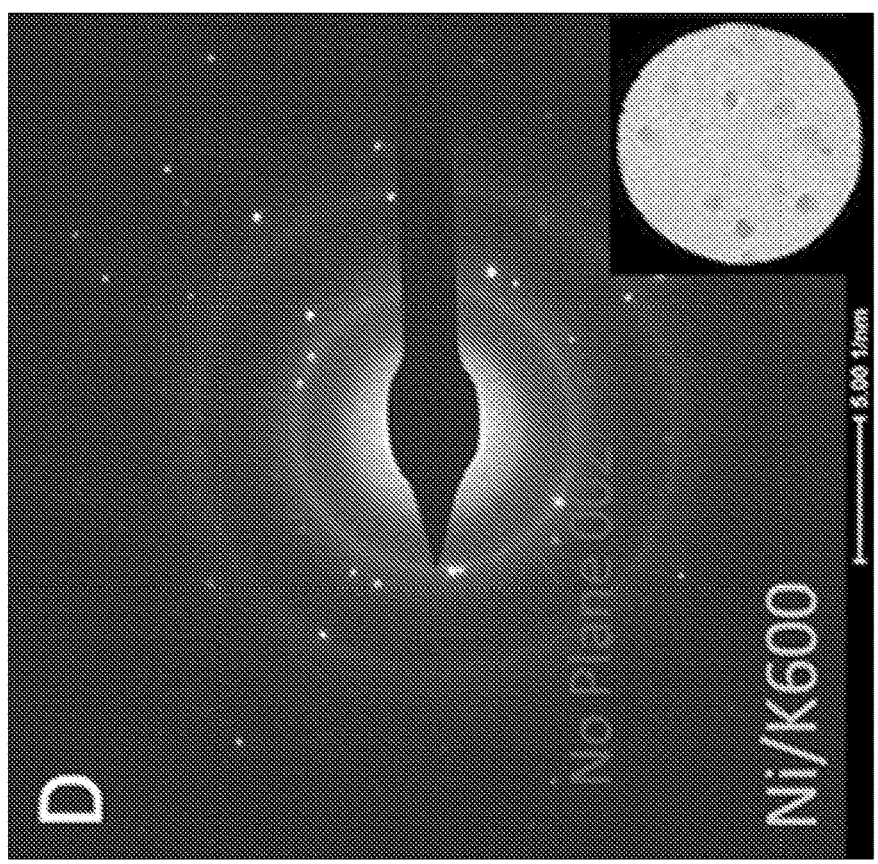
FIG. 6D shows a SAD pattern of Ni-functionalized (Ni/K600) taken at 100 nm area.
Figure 6C:
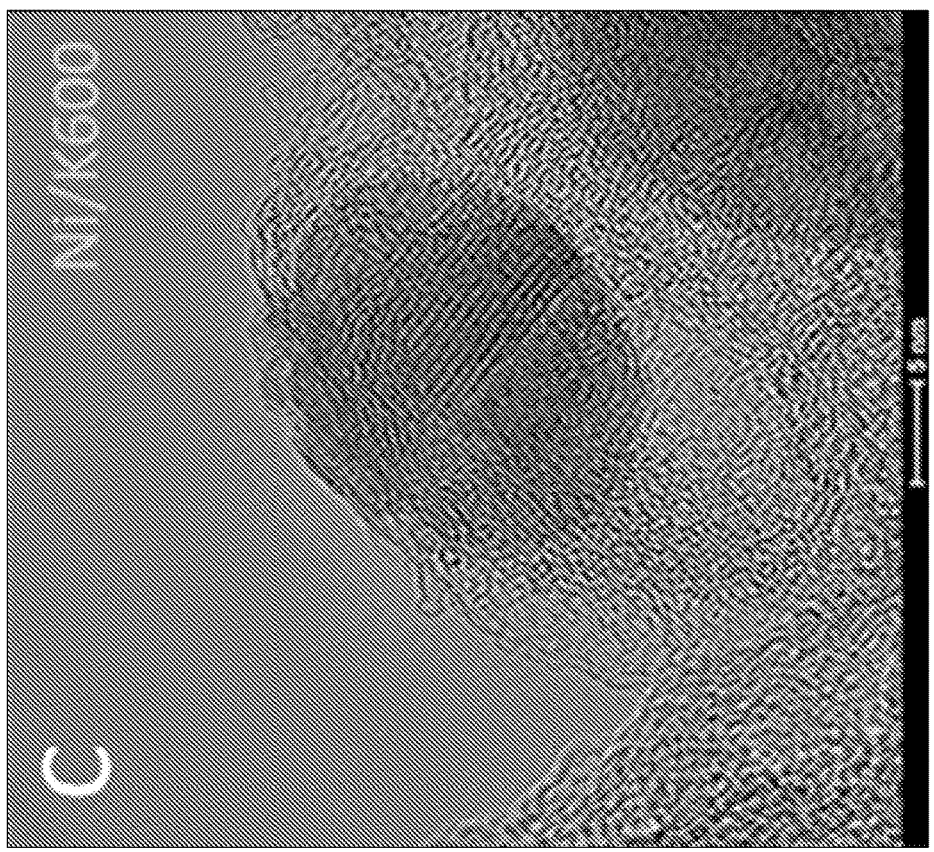
FIG. 6C shows a HR-TEM image of a 70% Ni-functionalized (Ni/K600).

FIG. 6A shows a HR-TEM image of Ni-functionalized/K600 with a Ni particle encapsulated by about five graphite layers. The Fast Fourier Transform (FFT) (FIG. 6A, inset) and the SAD (FIG. 6B) confirmed the carbonaceous material covering the nickel particle was graphite due to the presence of 002 lattice plane in both of these images. FIGS. 6C and 6D represent the big difference in SAD patterns between 30% Ni-functionalized/K600 and 30% Ni/K600, where the functionalized Ni had graphite plane (G-002) while the non-functionalized Ni had none. FIG. 6A shows a HR-TEM image of −30% Ni-functionalized/K600 (Ni-func/K600) and FIG. 6C shows a HR-TEM image of 30% Ni/K600. The SAD patterns of Ni-functionalized/K600 (FIG. 6B) vs. Ni/K600 (FIG. 6D) were taken at 100 nm areas.

Ex-situ XPS was conducted on three samples: Carbon support (K600 as a control), Ni/K600, and Ni-functionalized/K600. The surveys showed that no Ni was present on the K600 sample while peaks associated with $Ni^0$ were detected on both Ni samples (Moulder, J F, et al., 1992). Oxygen and carbon contributions are detected to roughly the same extent (comparable peaks areas) for all three samples.

Figure 7A:
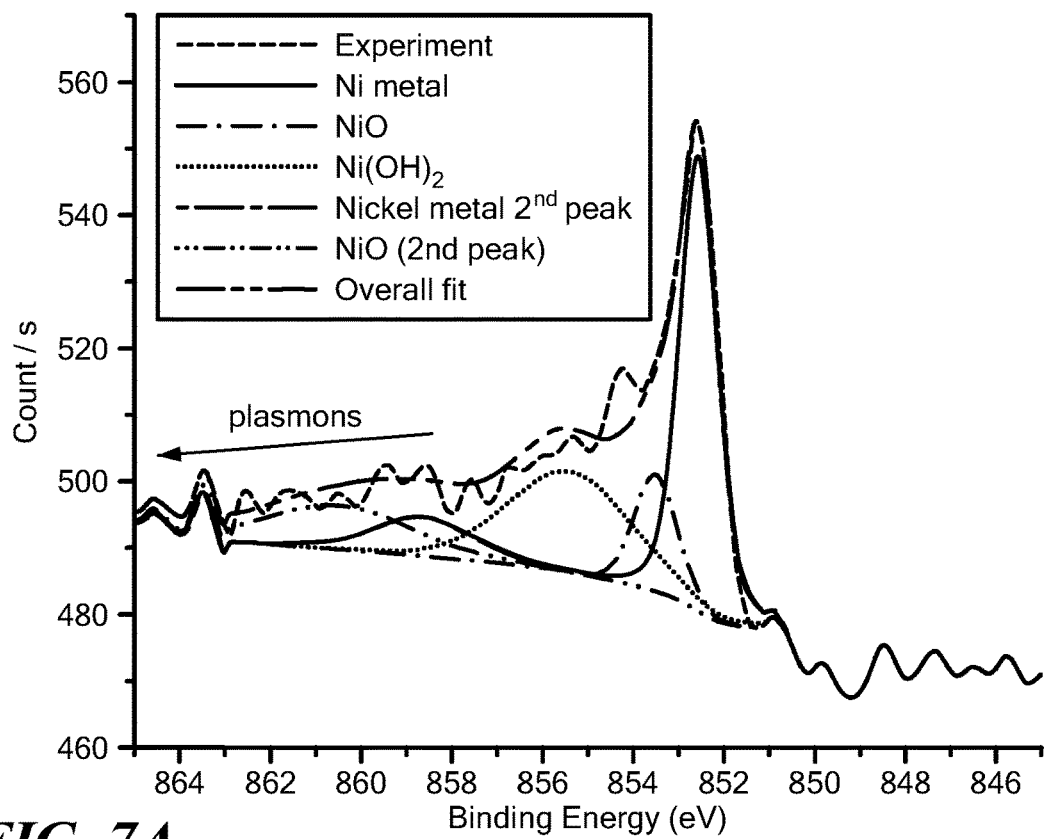
FIGS. 7A-7B show Ni 2p contribution for Ni-functionalized/K600 (FIG. 7A) and Ni/K600 (FIG. 7B).
Figure 7B:
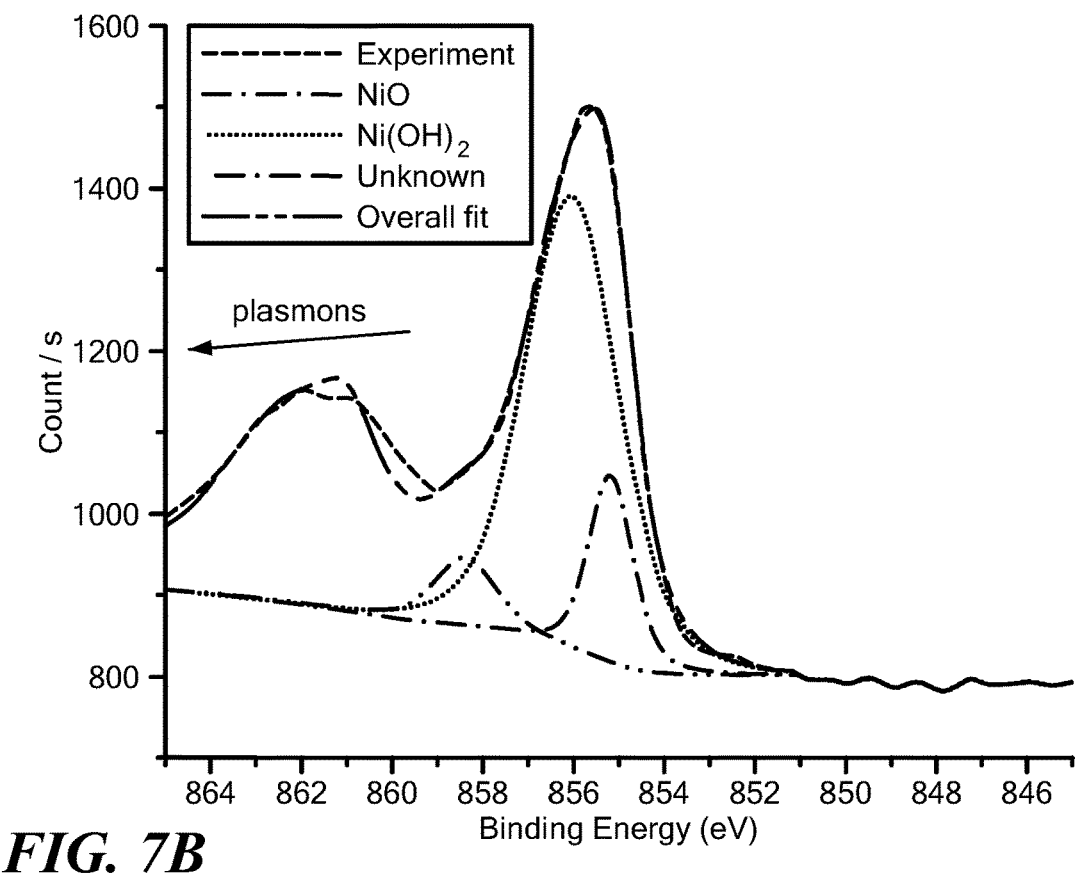

FIGS. 7A-7B show the deconvoluted peaks of the Ni 2p region XPS spectra of Ni-functionalized/K600 (FIG. 7A) and Ni/K600 (FIG. 7B). According to literature, the $Ni^0$ peak is located at 852.5±0.3 eV (Hufner, S, et al., 1975; McIntyre, N S, et al., 2007; Barr, T L, 1978; Beccaria, A M, et al., 1995; Moulder, J F, et al., 1992), while nickel monoxide (NiO) can be found and is centered at 854±0.3 eV (Beccaria, A M, et al., 1995; Moulder, J F, et al., 1992; Barr, T L, 1991; McIntyre, N S, et al., 2007), and nickel hydroxide ($Ni(OH)_2$) is centered at 855.5±0.3 eV (Beccaria, A M, et al., 1995; Moulder, J F, et al., 1992; McIntyre, N S, et al., 2007). Degenerate peaks can also be detected due to the plasmon effect (Hollinger, 1986) at 858.5 eV for $Ni^0$ and 861.2 eV for $NiO_x$ (Kim, K S, et al., 1972). The XPS spectrum of Ni/K600 (FIG. 7B) shows no $Ni^0$, and that the surface is comprised of $Ni(OH)_2$ (main phase) and NiO. Peaks associated with $Ni^0$ are absent in Ni/K600 due to oxidation from ambient conditions. Conversely, $Ni^0$ was the main contribution in the spectrum of Ni-functionalized/K600 (FIG. 7A and Table 1), indicating that the chelation of the Ni, formed during the preparation disclosed herein, resulted in protection from water and limits passivation of its surface under ambient conditions, as shown in FIGS. 6A and 6B.

As the two catalysts undergo comparable heat treatments and considering that Ni-functionalized/K600 is stable long term under cathodic potentials (unlike the Ni/K600, FIG. 5B), it can be inferred that this is due to the preservation of the $Ni^0$ active sites. The TEM images are consistent with this hypothesis as they show graphite layers encapsulating the nickel nanoparticles for the Ni-functionalized/K600 (FIG. 6A), where no graphite layers could be detected for the Ni/K600 (FIG. 6B). Based on the XPS spectra of these two catalysts, it is reasonable to assert that in the case of Ni-functionalized/K600, the graphite layers prevent severe passivation of the nickel surface, while no such protection is available for Ni/K600. Also, since both metallic nickel and nickel hydroxide active sites are necessary for HER kinetics (Volmer and Tafel steps), (Liang, Z, et al., 2017) the improved performance of Ni-functionalized/K600 relative to Ni/K600 can explained by a mixture of nickel metal and nickel hydroxide on the surface of the former whereas in the case of the latter the surface is comprised entirely of $Ni(OH)_2$ (see Table 1). C 1 s XPS spectra also showed evidence of C—C bonds on the surface of the catalysts, but the C—C bonds from the K600 and the one encapsulating the Ni particles are not differentiable.

TABLE 1

XPS quantitative results for Ni 2p survey

| Binding Energy (eV) | Bonds | Ni-functionalized/K600 | Ni/K600 |
| --- | --- | --- | --- |
| 852.6 | Ni metallic | 43.5 | 0.0 |
| 853.5 | NiO | 45.8 | 0.0 |
| 855.2 | $Ni(OH)_2$ | 10.7 | 100.0 |

Figure 8A:
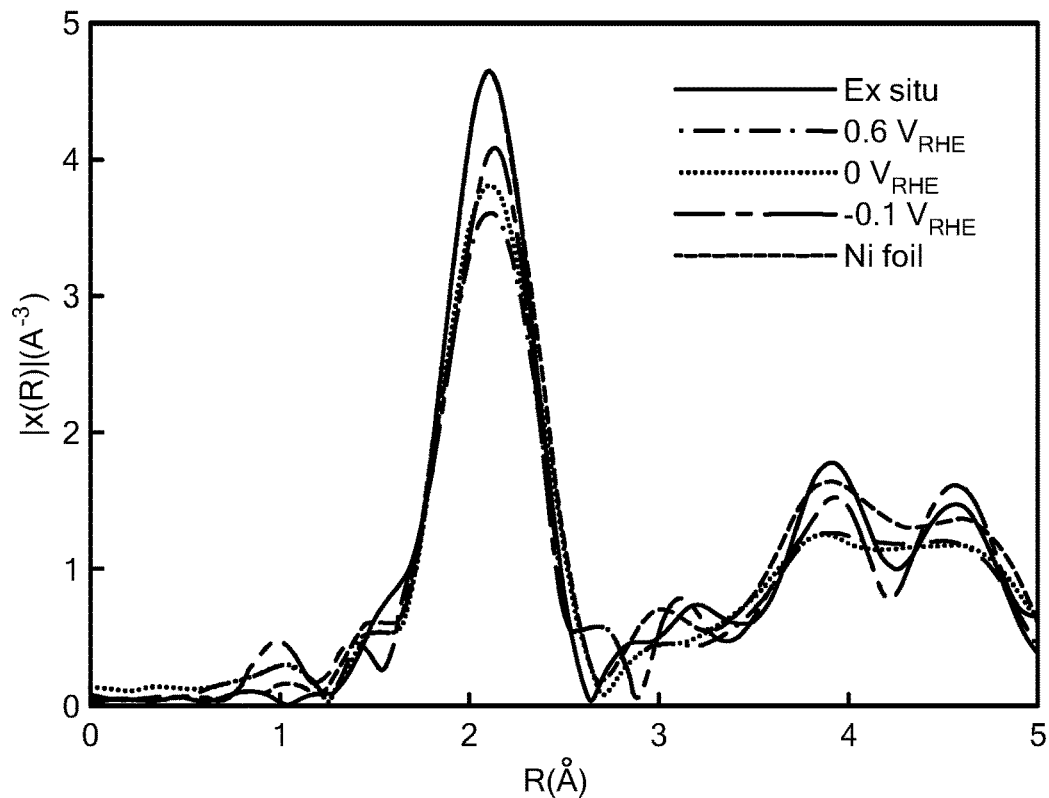
FIGS. 8A-8D show EXAFS for Ni-functionalized/K600 (FIG. 8A), ex-situ and in-situ XANES for Ni-functionalized/K600 (FIG. 8B), EXAFS for Ni/K600 (FIG. 8C), and ex-situ and in-situ XANES for Ni/K600 (FIG. 8D).
Figure 8B:
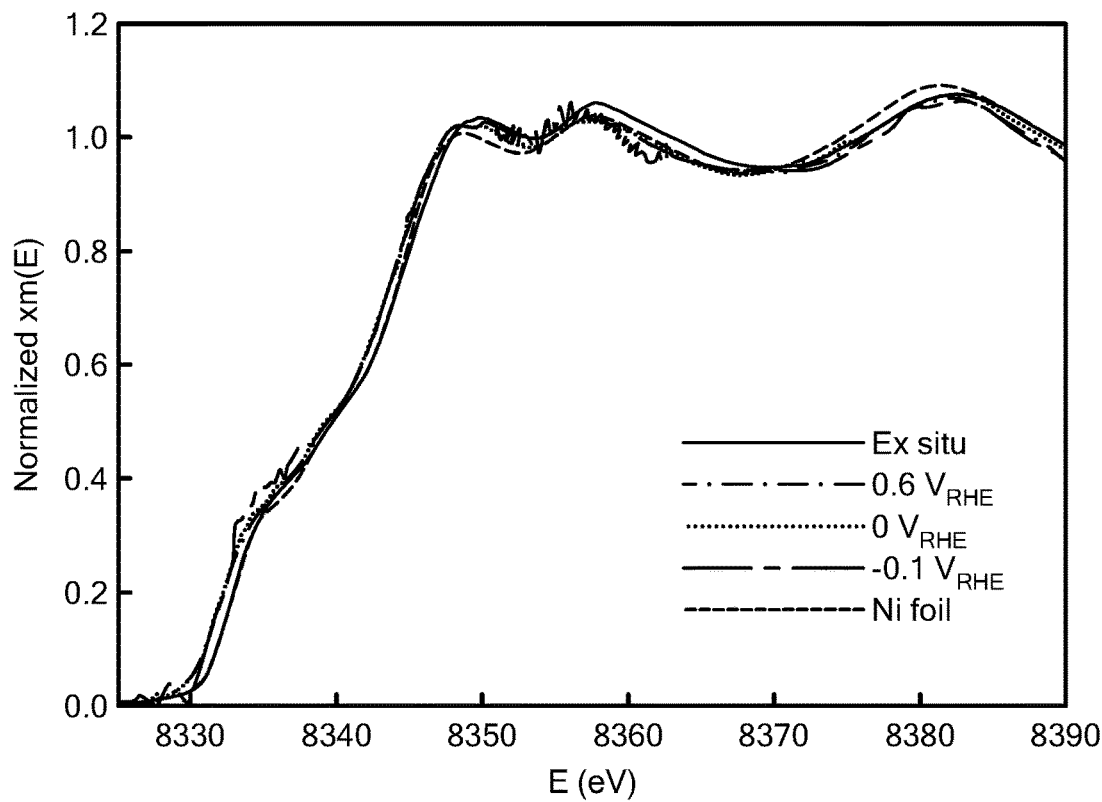
Figure 8C:
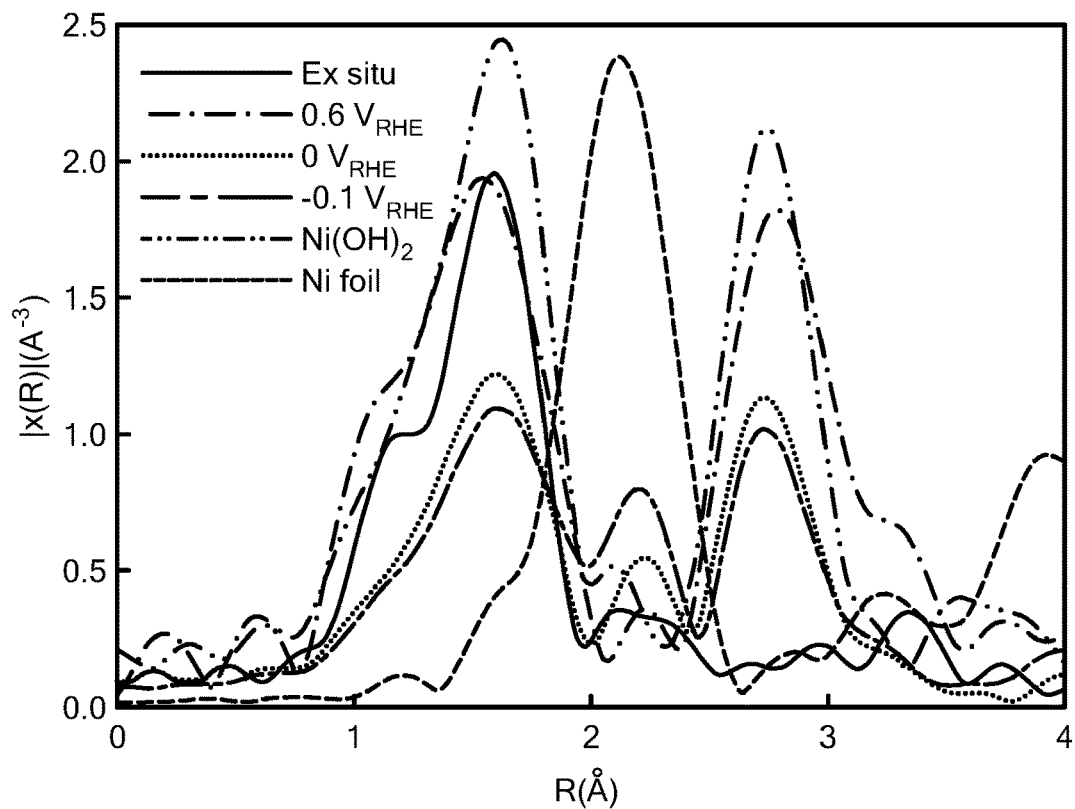
Figure 8D:
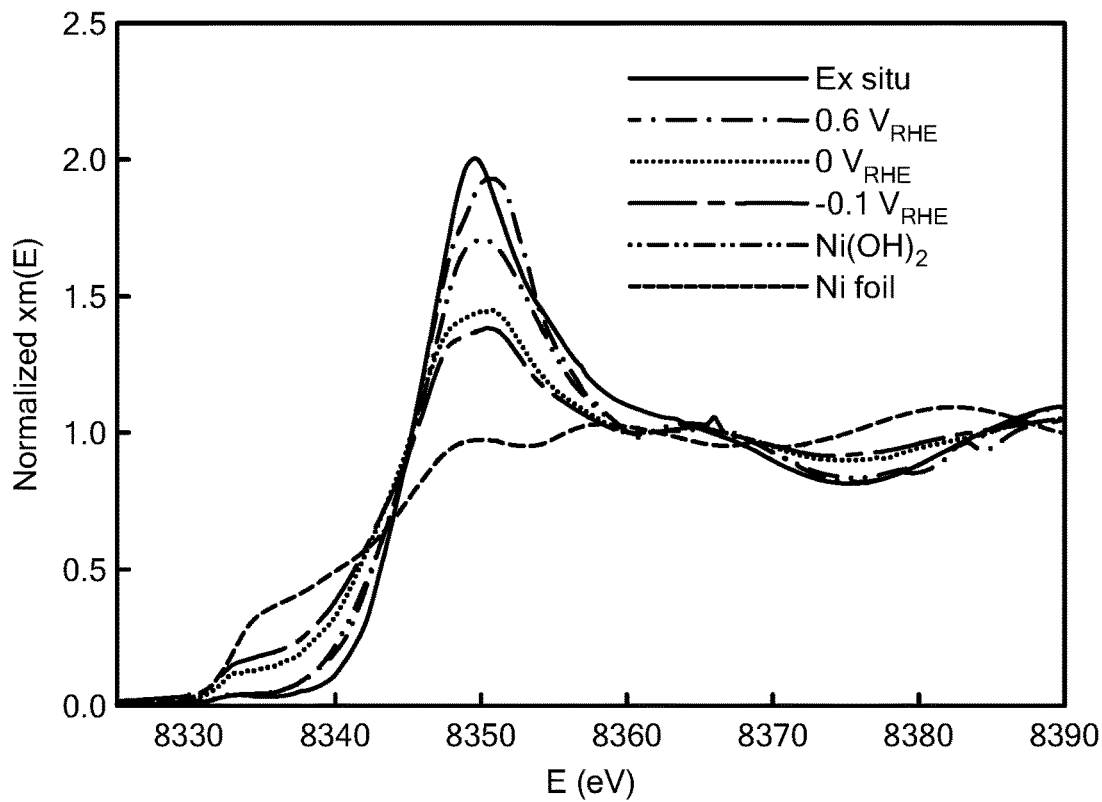

An in-situ XAS study was conducted on Ni/K600 and Ni-functionalized/K600 at the Ni K-edge in a $H_2$-saturated 0.1 M KOH electrolyte. Spectra were collected as a function of applied potentials to monitor the active $Ni/NiO_x$ redox behavior of the two samples during catalysis. FIG. 8C shows that the Fourier Transform of the extended X-ray absorption fine structure (FT-EXAFS) of the Ni/K600 at 0.6 $V_{RHE}$ has two peaks (1.5 Å and 2.8 Å) that coincide with the peaks of the $Ni(OH)_2$ standard with reduced peak intensity because of the nanoscale particle size. In addition, Ni/K600 has a small peak around 2 Å that overlaps that of the Ni reference foil. Meanwhile, the intensity of the X-ray absorption near edge structure (XANES) at 0.6 $V_{RHE}$ is in between those of $Ni(OH)_2$ and Ni foil. These results indicate the coexistence of metallic $Ni^0$ and $Ni(OH)_2$ at 0.6 $V_{RHE}$. As potentials gradually decrease to -0.1 $V_{RHE}$, the XANES intensity gradually drops; meanwhile the intensity of the FT-EXAFS peaks of $Ni(OH)_2$ reduces, accomplished by the dramatic increase of the intensity of the FT-EXAFS peak of $Ni^0$. These trends clearly indicate the transition from $Ni(OH)_2$ to $Ni^0$ triggered by lowering the potential.

Conversely, both the XANES (FIG. 8B) and FT-EXAFS (FIG. 8A) spectra of the Ni-functionalized/K600 closely resembles those of the Ni foil and remain nearly unchanged within the potential range of -0.1 to 0.6 $V_{RHE}$. The spectra of $Ni(OH)_2$ is undetectable. These results agree very with the XPS data and provide in-situ evidence that the functionalized carbon prevents the Ni surface from forming a passivating oxide layer. Note that the lack of peaks associated with $Ni(OH)_2$ in spectra shown in FIG. 8A does not necessarily indicate the absence of $Ni(OH)_2$ but rather the spectra is overwhelmed by the spectra of the $Ni^0$. This is a particularly reasonable deduction given that most of the Ni in the particles with an average particle size of 10 nm is electrochemical inactive and in the form of $Ni^0$. Therefore, the in situ XAS provides clear evidence that the surface Ni in the Ni-functionalized is protected by the functionalized carbon and largely retains the $Ni^0$ state.

The performance differences between Ni-functionalized/K600, Ni/K600 reduced, and Ni—Cr/K600 are unambiguously kinetics-based. Therefore, a kinetic model based on previous studies (Machado, 1994; Oshchepkov, A G, et al., 2018) was used to fit the Faradaic current of each catalyst to better understand how Ni-functionalized/K600 outclasses the two others catalysts. Oshchepkov et al. described the reduction mechanism of the hydroxyl species, which is considered the first reaction to occur when the electrode is polarized negatively (Oshchepkov, A G, et al., 2018):

$$s-(OH)_2 + e^- \rightarrow s-(OH) + OH^- \quad \text{(Rec. 6)}$$

$$s-(OH) + e^- \rightarrow s + OH^- \quad \text{(Rec. 7)}$$

The Volmer-Heyrovsky mechanism was considered for the HER, as it was postulated that it is most likely this consecutive step mechanism that is occurring for the HER, than a Volmer-Tafel (Machado, 1994).

$$s + e^- + H_2O \rightarrow H_{ads} + OH^- \quad \text{(Rec. 8—Volmer)}$$

$$H_{ads} + H_2O + e^- \rightarrow H_2 + OH^- + s \quad \text{(Rec. 9—Heyrovsky)}$$

Also, it was important to take into account the formation of hydrides, as it is very well known that $Ni^0$ tends to form hydrides when polarized negatively (Machado, et al., 1994; Hall, D S, et al., 2013; Franceschini, E A, et al., 2018; Hall, D S, et al., 2013)

$$s + H_2O + 2e^- \rightarrow s-H_- + OH^- \quad \text{(Rec. 10)}$$

Finally, as hydrides are unstable in water solution, it is natural to consider the evolution of hydrogen from hydrides species:

$$s-H_- + H_2O \rightarrow H_2 + OH^- + s \quad \text{(Rec. 11)}$$

Figure 9A:
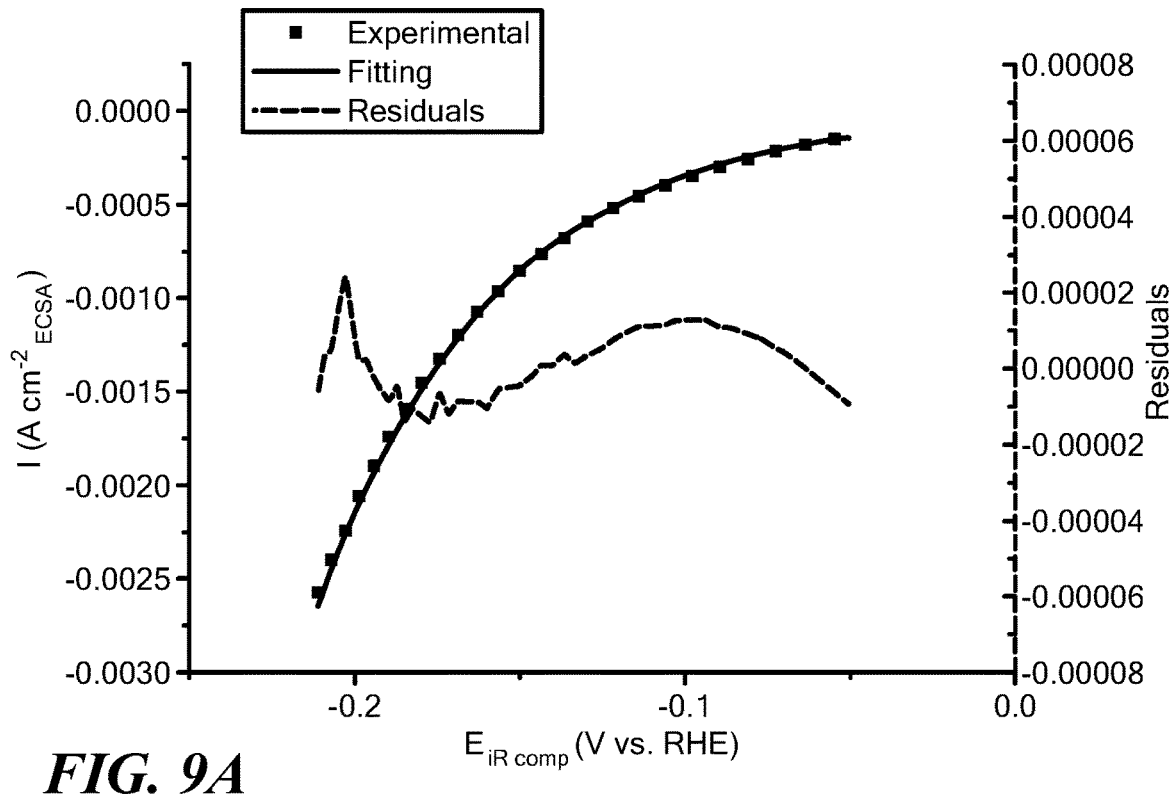
FIGS. 9A-9C show Faradaic current fitting for a 10 minute hold at −0.3V. Experimental data were taken from FIGS. 5A-5C.
Figure 9B:
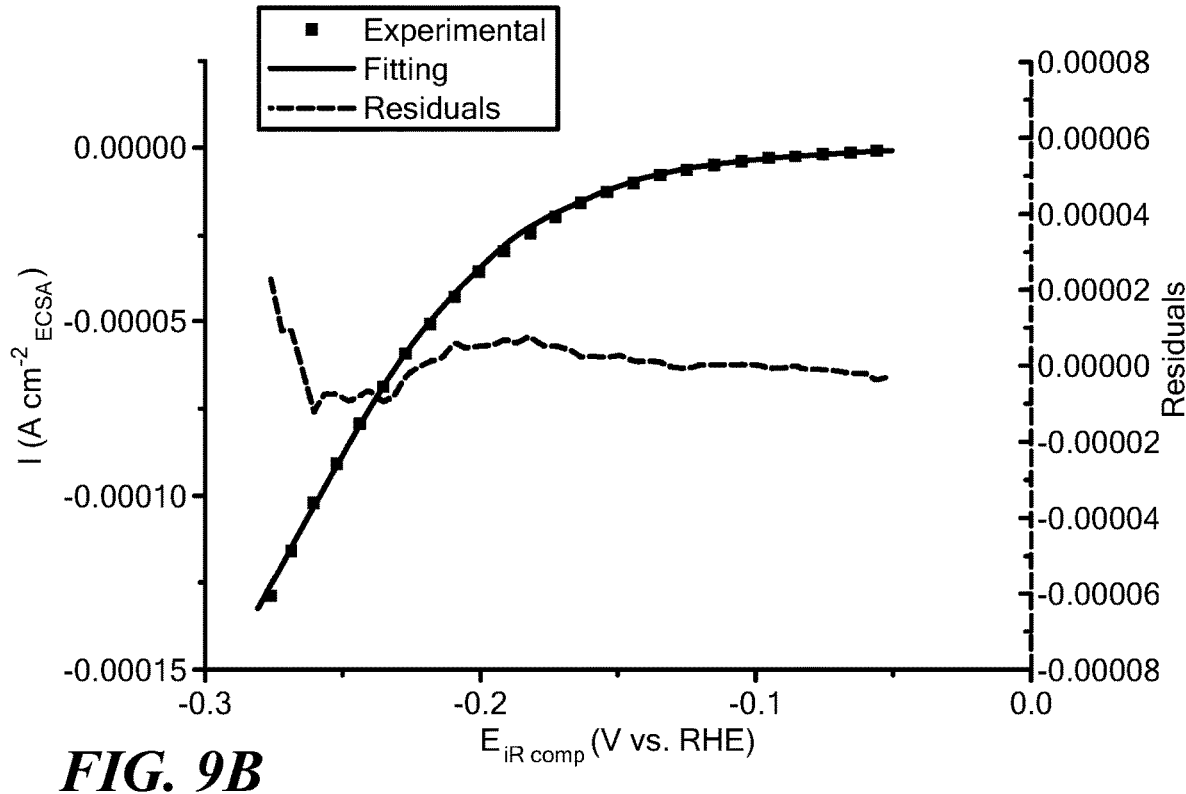
Figure 9C:
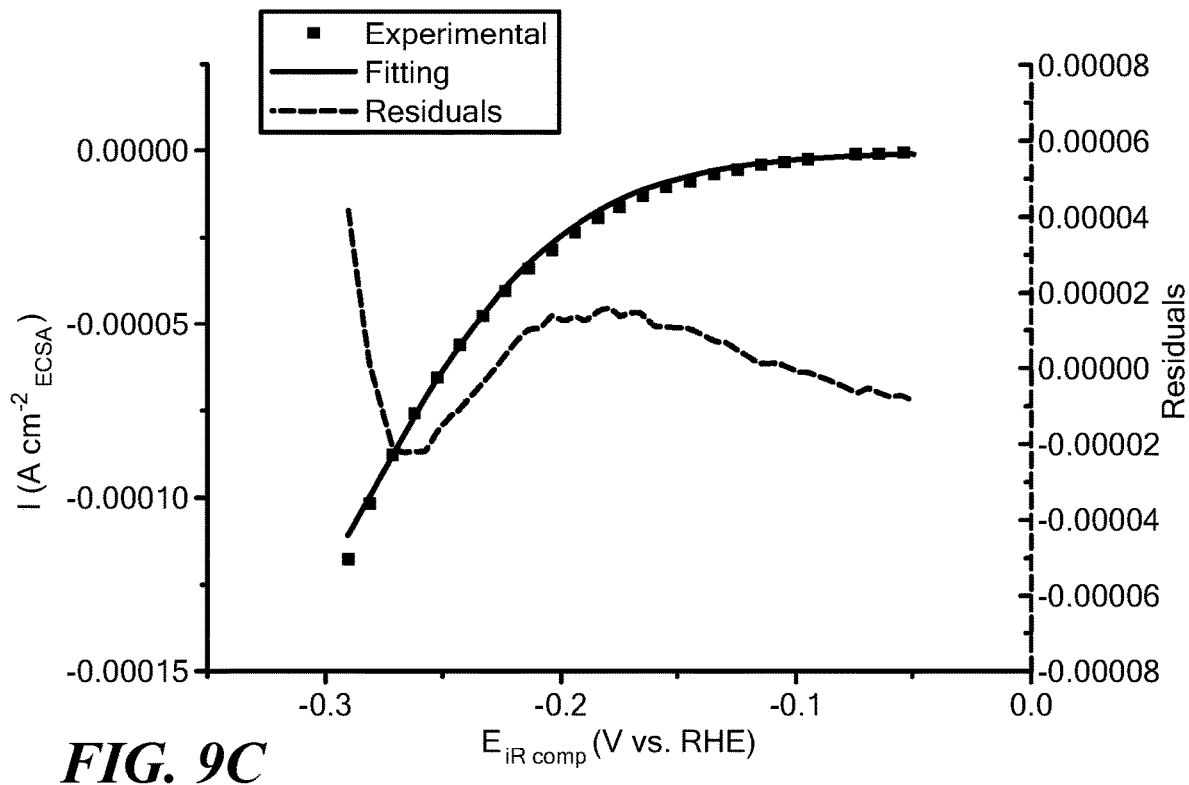

The kinetic model was developed assuming Butler-Volmer behavior, (Bard, A L, and Faulkner, L R, 2001; Diard, J, et al., 1996) and a Langmuir isotherm to simplify the system. The concentration of hydroxyl on the electrode interface was considered to be the same than in the bulk electrolyte. The development of the Kinetic Model (See supporting information) has led to the following faradaic current density expression:

FIGS. 9A-9C shows a very consistent fitting for each material. To keep a sensible fitting of the data, the rate constant for the Volmer step (easiest one) was constrained to the same order of magnitude for the three materials (as in the end, the barrier energy for the binding of H to a nickel active site should be the same for the three catalysts). The fitted kinetic parameters are presented in Table 2.

TABLE 2

Fitted parameters value, for the 10 m cathodic hold at −0.3 VRHE experiment for Ni/K600 reduced, Ni—Cr/K600 and Ni-functionalized/K600

| | Ni functionalized/K600 | Ni/K600 | Ni—Cr/K600 | Reaction |
|---|---|---|---|---|
| $k_{o,1}$ (cm s$^{-1}$) | 4.36E−03 | 5.00E−05 | 5.00E−05 | s − (OH)$_2$ + e$^-$ ↔ s − (OH)+ |
| $k_{r,1}$ (cm s$^{-1}$) | 4.03E−02 | 5.00E−05 | 5.00E−05 | |
| $\alpha_{r,1}$ | 0.53 | 0.5 | 0.50 | |
| $k_{o,2}$ (cm s$^{-1}$) | 4.00E−03 | 5.02E−05 | 5.02E−05 | s − (OH) + e$^-$ ↔ s + OH$^-$ |
| $k_{r,2}$ (cm s$^{-1}$) | 5.98E−02 | 5.00E−05 | 5.00E−05 | |
| $\alpha_{r,2}$ | 0.50 | 0.5 | 0.50 | |
| $k_{r,3}$ (cm s$^{-1}$) | 1.84E+00 | 1.76E+00 | 1.77E+00 | s + e$^-$ + H$_2$O → H$_{ads}$ + OH$^-$ |
| $\alpha_{r,3}$ | 0.80 | 0.81 | 0.82 | |
| $k_{r,4}$ (cm s$^{-1}$) | 5.41E−02 | 5.45E−05 | 4.02E−05 | H$_{ads}$ + H$_2$O + e$^-$ → H$_2$ + OH$^-$ + s |
| $\alpha_{r,4}$ | 0.51 | 0.5 | 0.50 | |
| $k_{r,5}$ (cm s$^{-1}$) | 1.00E−04 | 3.95E−01 | 3.92E−01 | s + H$_2$O + 2e$^-$ → s − H$_-$ + OH$^-$ |
| $\alpha_{r,5}$ | 0.50 | 0.5 | 0.50 | |
| $k_{r,6}$ (cm s$^{-1}$) | 2.21E+00 | 2.35E−01 | 1.94E−01 | s − H$_-$ + H$_2$O H$_2$ + OH$^-$ + s |
| $k_{r,3}/k_{r,4}$ | 34 | 32353 | 43866 | |
| $k_{r,6}/k_{r,5}$ | 22012 | 0.6 | 0.5 | |
| $k_{r,1}/k_{o,1}$ | 9.3 | 1.0 | 1.0 | |
| $k_{r,2}/k_{o,2}$ | 14.9 | 1.0 | 1.0 | |

$$i_f = \frac{-F\Gamma(2K_{R3} + 2K_{R5})}{1 + \frac{K_{R3}}{K_{R4}} + \frac{K_{R5}}{k_{R6}} + \frac{K_{O2}[OH^-]^*}{K_{R2}} + \frac{K_{O1}K_{O2}[OH^-]^{*2}}{K_{R1}K_{R2}}} \quad (Eq. 1)$$

With:

$$K_{O,i} = k_{O,i}\exp(\alpha_{o,i}n_i f(\eta + E_{th,i})) \quad (Eq. 2)$$

$$K_{R,i} = k_{R,i}\exp(-\alpha_{R,i}n_i f(\eta + E_{th,i})) \quad (Eq. 3)$$

And:

$\alpha_{O,i}$: symmetry factor for the oxidation of the elementary step i $\alpha_{R,i}$: symmetry factor for the reduction of the elementary step i (and $\alpha_{O,i}+\alpha_{R,i}=1$)

f=F/RT $k_{O,i}$: rate constant of the oxidation direction, for the elementary step i $k_{R,i}$: rate constant of the reduction direction, for the elementary step i E: Electrode potential Γ: the concentration of the surface-active sites (mol cm')

$\theta_i$: coverage rate of species I (and $\Sigma\theta_i=1$)

[OH$^-$]*: Bulk concentration of the hydroxide

Figure 9D:
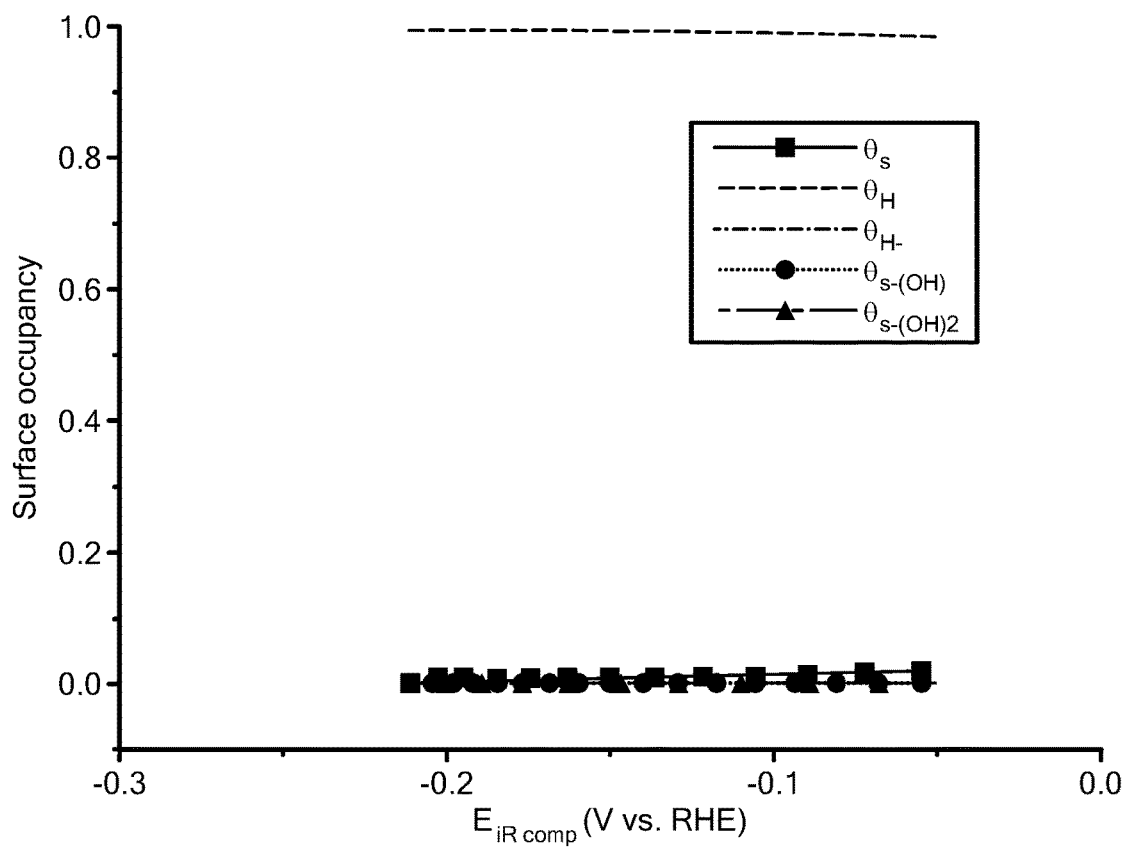
FIGS. 9D-9F show surface occupancy of the five surface sites for FIG. 9D—Ni/K600.
Figure 9E:
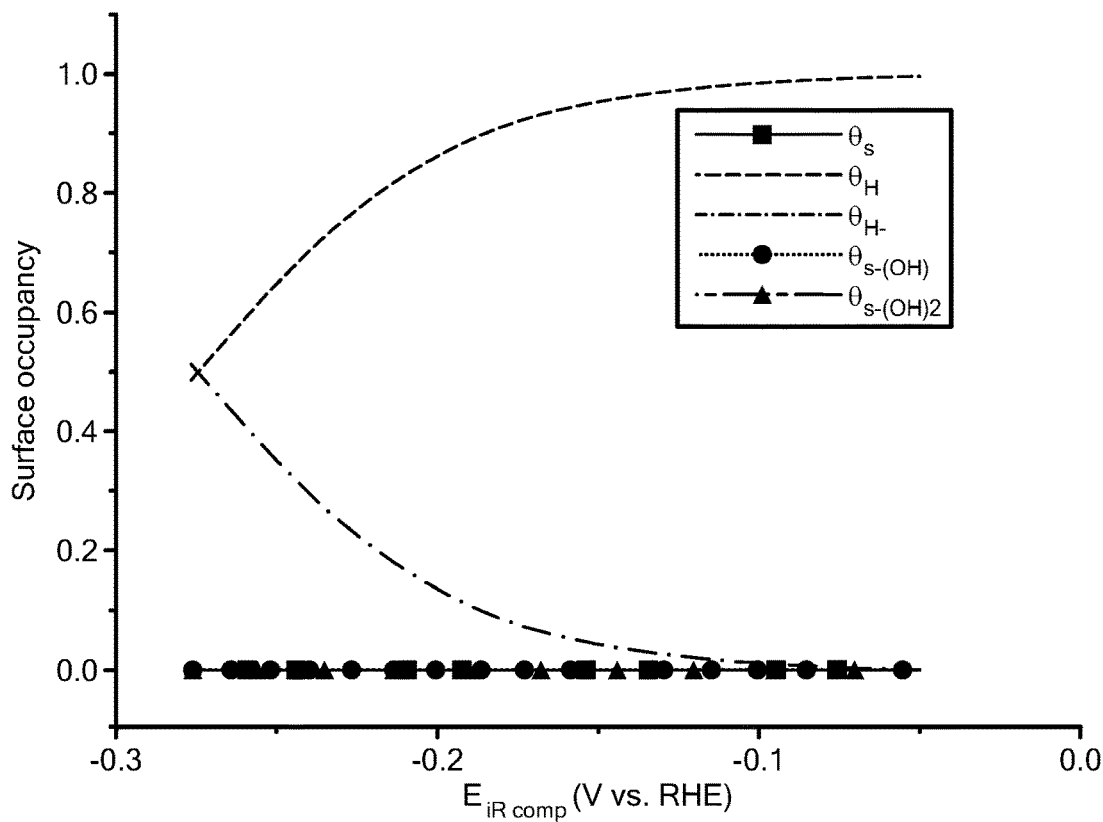
Figure 9F:
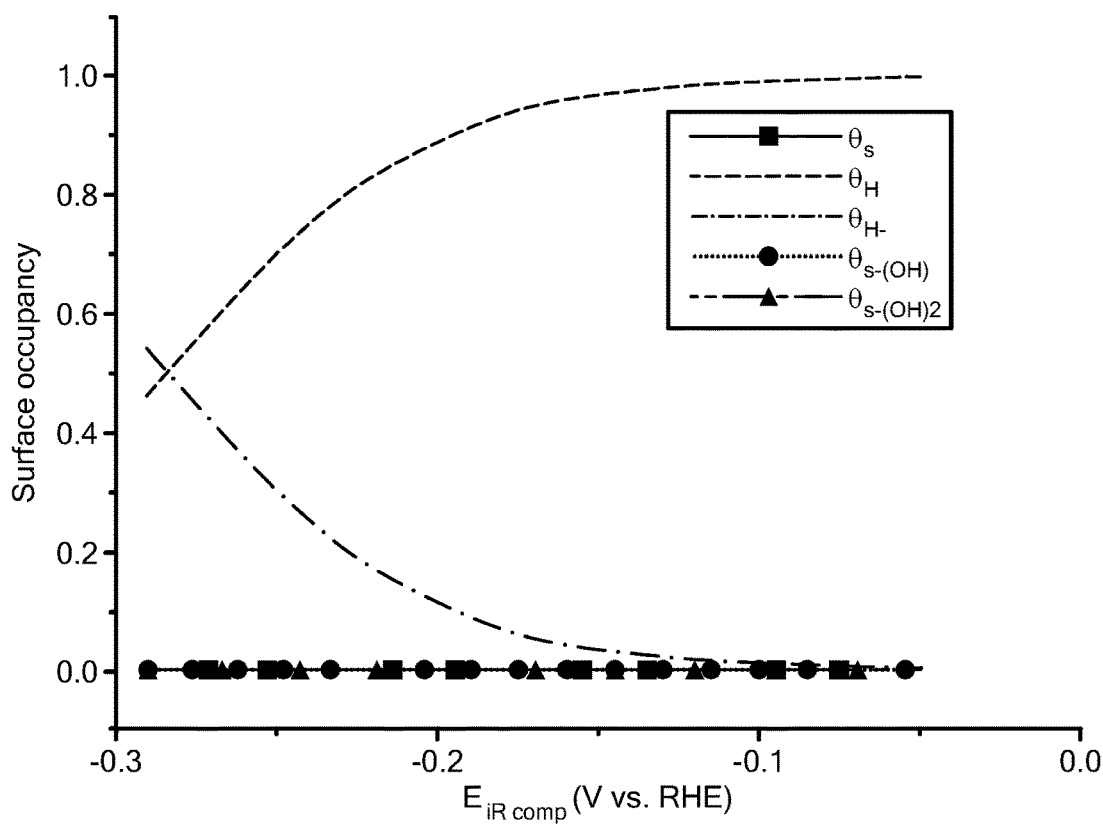

The experimental data were fitted to the model, and this was done using a non-linear least-square method program. The correlation between the experimental and the calculated Faradaic current density is presented on FIGS. 9A-9C, for the 10 m hold −0.3 V$_{RHE}$. FIGS. 9A-9C shows Faradaic current fitting for the 10 minute hold at −0.3V. Experimental data were taken from FIGS. 5A-5C; Ni/K600 (5A), Ni—Cr/K600 (5B), Ni-functionalized/K600 (5C). FIGS. 9D-9F show surface occupancy of the five surface sites for Ni/K600 (9A), Ni—Cr/K600 (9B), and Ni-functionalized/K600 (9C).

As expected, the fitting shows that the fastest step for the HER is the Volmer step, thus implying that Heyrovsky is the rate-determining step for the HER. However, this is not as simple: when looking at the kr3/kr4 ratio, it is evident that the latter is by far lower for the Ni-functionalized/K600, than for the Ni/K600 and Ni—Cr/K600, showing a faster Heyrovsky mechanism for the Ni-functionalized/K600. Another observation is the kr6/kr5 ratio that depicts the speed of oxidation of the hydrides. In both Ni/K600 and Ni—Cr/K600, the ratio is very low, implying that the hydrides species are accumulating on the electrode surface. On the other hand, for the Ni-functionalized/K600, the ratio is very high, implying that the hydrogen evolution from the hydrides is a very fast process. Also, it must be noted that, the value of kr5 (hydride formation on the electrode) is much slower for Ni-functionalized/K600 than for the other two catalysts. In order to better grasp the role of the hydride poisoning of the surface, the surface occupancy of each active sites versus the potential is depicted on FIGS. 9D-9F.

FIGS. 9D-9F show a surface poisoning/accumulation of NiH$_x$ for Ni/K600 and Ni—Cr/K600, while the surface of Ni-functionalized/K600 is nearly free of NiH$_x$. The impact of surface hydrides on the HER is evident, as a high surface concentration of H$_{ads}$ is crucial for a fast proceeding of the Heyrovsky step, and the worst materials (Ni/K600 and Ni—Cr/K600) are clearly depicting that the greater the polarization to negative potential, the lower the amount of H$_{ads}$. It is thus highly probable that the graphite shell, surrounding the Ni nanoparticle is playing a key role in the deactivation of the hydride formation of Ni, while not affecting the HER performances. Similar effects were claimed with Ni, embedded in reduced graphene oxides (Franceschini, E A, et al., 2018).

Regarding a H$_2$ pump and its application, hydrogen pump fuel cell experiments were performed to assess the performance and stability of the Ni-based HER catalysts in a practical context. Fuel cell tests were in run in a hydrogen pump configuration, as opposed to a water electrolysis configuration, in order to decouple the overall cell performance from the sluggish kinetics of the OER. The reactions in a hydrogen pump fuel cell are:

Anode: $H_2(g) + 2OH^-(aq) \rightarrow 2H_2O + 2e^-$ (Rec. 12)

Cathode: $H_2O + 2e^- \rightarrow 2OH^-(aq) + H_2(g)$ (Rec. 13)

Overall: $H_2(g) \rightarrow H_2(g)$ (Rec. 14)

Figure 10:
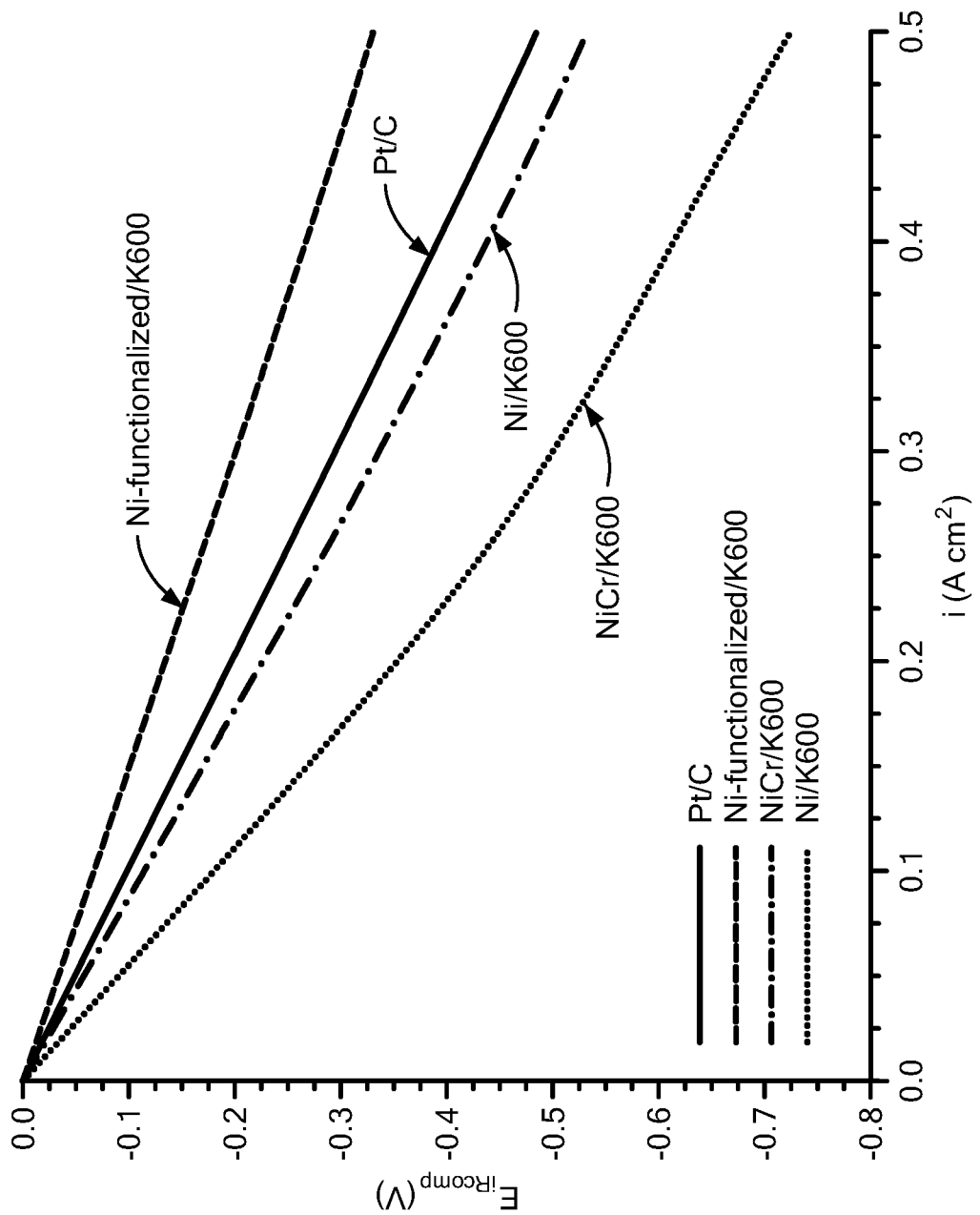
FIG. 10 shows polarization curves of hydrogen pump fuel cells equipped with Ni-functionalized/K600, Ni—Cr/K600, Ni/K600 or Pt/C HER catalysts.

While hydrogen pump cells do have practical applications such as electrochemical hydrogen separation, here it is used only to demonstrate how these HER catalysts perform in a fuel cell. FIG. 10 compares the polarization curves of three hydrogen pump cells, each equipped with one of the three Ni-based HER catalysts, to that of a cell with a Pt/C HER electrode. In all four cells, a Pt/C electrode was used for HOR. Surprisingly, the polarization curves in FIG. 10 contradicts several trends in the curves obtained in RDE experiments shown in FIG. 3. At every point of the curve, Ni-functionalized/K600 requires a lower overpotential than the other HER catalysts to attain the same current density. Compared to the polarization curve obtained from the RDE study shown in FIG. 3, where Ni-functionalized/K600 does not surpass the current density of Pt/C until ~520 mV. Ni-functionalized/K600 does appear to be preferable to Pt/C in a water splitting cell: at 500 mA cm$^{-2}$, a current density used to benchmark electrolysis cells, Ni-functionalized/K600 out performs Pt/C by 154 mV. Differences in performance between Pt/C vs. Ni-functionalized/K600 in fundamental and practical contexts will be examined in the subsequent studies. FIG. 10 also contradicts FIG. 5 in that Ni/K600 outperforms Ni—Cr/K600 as higher cathodic current was applied. However, it is important to remember Ni—Cr/K600 is more susceptible to hydride poisoning (FIG. 5C) and it is likely that the catalyst was deactivated during MEA conditioning.

In FIG. 10, steady-state studies of the three Ni-based catalysts were collected at 500 mA/cm$^2$ over a period of three hours were used to assess the stability of these catalysts. The cathodic stability trends shown in FIG. 5 match those collected in the $H_2$ pump cell. Ni-functionalized/K600 showed no decay in performance and improved slightly over the three-hour experiment. Ni/K600 and Ni—Cr/K600 both required increasing overpotential at rates of 4.84 mV hr$^{-1}$ and 3.80 mV hr$^{-1}$ to maintain the current density. The hydrogen pump experiments demonstrate the high-performance and robust nature of Ni-functionalized/K600 relative to other classes of Ni-based HER catalysts in a practical context.

X-ray diffraction (XRD) patterns were obtained using an Ultima IV XRD (Rigaku) operated at 40 kV and 44 mA. The X-ray source was Cu Ka (lambda=1.541 A). The procedure was a function of time that uses 0.1° step size and 5 s hold per step. XRD patterns were analyzed with PDXL 2 (Rigaku) software.

X-ray photoelectron (XPS) spectra were acquired using a Kratos Axis Ultra DLD spectrometer using a monochromatic al Ka, powered source at 125 W. Charge neutralization was not necessary. Three areas of each sample were analyzed ensure consistency. Pass energies of 20 eV were used for the acquisition of high-resolution spectra. The fitting and quantifications were made possible thanks to Casa XPS software, and the sensitivities factors were the ones provided by the manufacturer. High-resolution spectra were acquired for Ni 2p, C 1 s, O 1 s, and N 1 s. Acquisition times for the surveys were of 3 minutes, while for high-resolution spectra, surveys were acquired for 1 hour.

Overall metal loading was determined by inductively coupled plasma optical emission spectroscopy (ICP-OES) performed by Robertson Microlit Laboratories (Ledgewood, N.J.).

The preparation of the XAS electrodes can be found in previous work (Jia, Q, et al., 2015). The XAS experiments were conducted at room temperature in a previously described flow half-cell in which continuously $H_2$-purged 0.1 M KOH was circulated (You, B, et al., 2016). The voltage cycling limits were −0.1 to 0.6 $V_{RHE}$. The XAS spectra at the Ni edge were collected in the transmission mode, at the ISS 8-ID beam line of the National Synchrotron Light Source (NSLS) II, Brookhaven National Laboratory (BNL). Typical experimental procedures were utilized with details provided in previous work (Jia, Q, et al., 2014).

High resolution-transmission electron microscopy (HR-TEM) and selected area diffraction (SAD). The (TEM) images and their Fast Fourier Transformations (FFT) as well as selected area diffraction were collected on an FEI Titan Themis 300 HR-TEM (Northeastern University, Burlington campus, MA). Scanning electron microscope (SEM) images and energy dispersive spectra (EDS) were collected on a S-4800 FE (Hitachi).

TGA data of Ni-functionalized catalyst was collected on a SDT Q600 (V20.9 Build 20, TA instruments). The Ni$^{2+}$-cupferron complex (i.e. without carbon support) was characterized using a 10° C. min$^{-1}$ ramp to 700° C., Ar flow (100 min$^{-1}$).

REFERENCES

Bard, A. J.; Faulkner, L. R. *Electrochemical Methods: Fundamentals and Applications*; John Wiley & Sons, 2001.

Barr, T. L. An ESCA Study of the Termination of the Passivation of Elemental Metals. *J. Phys. Chem.* 1978, 82 (16), 1801-1810.

Barr, T. L. Recent Advances in X-ray Photoelectron Spectroscopy Studies of Oxides. *J. Vac. Sci. Technol. A Vacuum, Surfaces, Film.* 1991, 9 (3), 1793-1805.

Bates, M. K.; Jia, Q.; Ramaswamy, N.; Allen, R. J.; Mukerjee, S. Composite Ni/NiO—Cr2O3 Catalyst for Alkaline Hydrogen Evolution Reaction. *J. Phys. Chem. C* 2015, 119 (10), 5467-5477.

Beccaria, A. M.; Poggi, G.; Castello, G. Influence of Passive Film Composition and Sea Water Pressure on Resistance to Localised Corrosion of Some Stainless Steels in Sea Water. *Br. Corros. J.* 1995, 30 (4), 283-287.

Bottei, R. S.; Schneggenburger, R. Thermal and Spectral Study of Some Divalent Metal Chelates of Cupferron and Dicupferron. *J. inorg. nucl. Chem.* 1970, 32 (1960).

Danilovic, N.; Subbaraman, R.; Strmcnik, D.; Chang, K. C.; Paulikas, A. P.; Stamenkovic, V. R.; Markovic, N. M. Enhancing the Alkaline Hydrogen Evolution Reaction Activity through the Bifunctionality of Ni(OH)2/Metal Catalysts. *Angew. Chemie—Int. Ed.* 2012, 51 (50), 12495-12498.

Deng, J.; Ren, P.; Deng, D.; Yu, L.; Yang, F.; Bao, X. Highly Active and Durable Non-Precious-Metal Catalysts Encapsulated in Carbon Nanotubes for Hydrogen Evolution Reaction. *Energy Environ. Sci.* 2014, 7 (6), 1919-1923.

Diard, J.; Montella, C.; Le Gorrec, B. *Cinetique Electrochimique*, Methodes.; 1996.

Durst, J.; Siebel, A.; Simon, C.; Hasché, F.; Herranz, J.; Gasteiger, H. A. New Insights into the Electrochemical Hydrogen Oxidation and Evolution Reaction Mechanism. *Energy Environ. Sci.* 2014, 7 (7), 2255-2260.

Energy Efficiency and Renewable Energy (EERE). Multiyear Research, Development and Demonstration Plan. 2012, 11007, 1-44.

Franceschini, E. A.; Lacconi, G. I. Synthesis and Performance of Nickel/Reduced Graphene Oxide Hybrid for Hydrogen Evolution Reaction. *Electrocatalysis* 2018, 9 (1), 47-58.

Hall, D. S.; Bock, C.; MacDougall, B. R. The Electrochemistry of Metallic Nickel: Oxides, Hydroxides, Hydrides and Alkaline Hydrogen Evolution. *J. Electrochem. Soc.* 2013, 160 (3), F235-F243.

Hall, D. S.; Bock, C.; Macdougall, B. R. Surface Layers in Alkaline Media: Nickel Hydrides on Metallic Nickel Electrodes. 2013, 50 (31), 165-179.

Hollinger, G. Spectroscopie de Photoélectrons XPS Ou ESCA et UPS. *Tech. l'ingénieur-Archives* 1986, 33 (0), P2625 1-18.

Hufner, S.; Wertheim, G. K.; Wernick, J. H. XPS Core Line Asymmetries in Metals. *Solid State Commun.* 1975, 17, 417-422.

Jia, Q.; Liang, W.; Bates, M. K.; Mani, P.; Lee, W.; Mukerjee, S. Activity Descriptor Identification for Oxygen Reduction on Platinum-Based Bimetallic Nanoparticles: In Situ Observation of the Linear Composition-Strain-Activity Relationship. *ACS Nano* 2015, 9 (1), 387-400.

Jia, Q.; Caldwell, K.; Ramaker, D. E.; Ziegelbauer, J. M.; Liu, Z.; Yu, Z.; Trahan, M.; Mukerjee, S. In Situ Spectroscopic Evidence for Ordered Core—Ultrathin Shell Pt1Co1 Nanoparticles with Enhanced Activity and Stability as Oxygen Reduction Electrocatalysts. *J. Phys. Chem. C* 2014, 118 (35), 20496-20503.

Jin, H.; Wang, J.; Su, D.; Wei, Z.; Pang, Z.; Wang, Y. In Situ Cobalt-Cobalt Oxide/N-Doped Carbon Hybrids as Superior Bifunctional Electrocatalysts for Hydrogen and Oxygen Evolution. *J. Am. Chem. Soc.* 2015, 137 (7), 2688-2694.

Kim, K. S.; Davis, R. E. Electron Spectroscopy of the Nickel-Oxygen System. *J. Electron Spectros. Relat. Phenomena* 1972, 1 (3), 251-258.

Krstajić, N.; Popović, M.; Grgur, B.; Vojnović, M.; Šepa, D. On the Kinetics of the Hydrogen Evolution Reaction on Nickel in Alkaline Solution—Part I. The Mechanism. *J. Electroanal. Chem.* 2001, 512 (1-2), 16-26.

Li, X.; Liu, P. F.; Zhang, L.; Zu, M. Y.; Yang, Y. X.; Yang, H. G. Enhancing Alkaline Hydrogen Evolution Reaction Activity through Ni-Mn3O4 nanocomposites. *Chem. Commun.* 2016, 52 (69), 10566-10569.

Liang, Z.; Ahn, H. S.; Bard, A. J. A Study of the Mechanism of the Hydrogen Evolution Reaction on Nickel by Surface Interrogation Scanning Electrochemical Microscopy. *J. Am. Chem. Soc.* 2017, 139 (13), 4854-4858.

Liu, H.; Chen, S.; Chang, P.; Tsai, S. J. Analytica Chimica Acta 459 (2002) 161-168.Pdf. 2002, 459, 161-168.

Liu, B.; Zhao, Y. F.; Peng, H. Q.; Zhang, Z. Y.; Sit, C. K.; Yuen, M. F.; Zhang, T. R.; Lee, C. S.; Zhang, W. J. Nickel-Cobalt Diselenide 3D Mesoporous Nanosheet Networks Supported on Ni Foam: An All-PH Highly Efficient Integrated Electrocatalyst for Hydrogen Evolution. *Adv. Mater.* 2017, 29 (19).

Lyons, M. E. G.; Brandon, M. P. The Oxygen Evolution Reaction on Passive Oxide Covered Transition Metal Electrodes in Alkaline Solution Part 1-Nickel. *Int. J. Electrochem. Sci.* 2008, 3 (12), 1425-1462.

Lyons, M. E. G.; Doyle, R. L. Enhanced Oxygen Evolution at Hydrous Oxy-Hydroxide Modified Iron Electrodes in Aqueous Alkaline Solution. *Int. J. Electrochem. Sci.* 2011, 6 (11), 5710-5730.

Machado, S. A. S.; Avaca, L. A. The Hydrogen Evolution Reaction on Nickel Surfaces Stabilized by H-Absorption. *Electrochim. Acta* 1994, 39 (10), 1385-1391.

McIntyre, N. S.; Cook, M. G. X-Ray Photoelectron Studies on Some Oxides and Hydroxides of Cobalt, Nickel, and Copper. *Anal. Chem.* 2007, 827 (11).

McKone, J. R.; Sadtler, B. F.; Werlang, C. A.; Lewis, N. S.; Gray, H. B. Ni—Mo Nanopowders for Efficient Electrochemical Hydrogen Evolution. *ACS Catal.* 2013, 3 (2), 166-169.

Miles, M. H. Periodic Variations of Overvoltages for Water Electrolysis in Acid Solutions from Cyclic Voltammetric Studies. *J. Electrochem. Soc.* 1976, 123 (10), 1459.

Miles, M. H.; Kissel, G.; Lu, P. W. T.; Srinivasan, S. Effect of Temperature on Electrode Kinetic Parameters for Hydrogen and Oxygen Evolution Reactions on Nickel. *J. Electrochem. Soc.* 1976, 123 (12), 1858-1859.

Moretti, Franco B. E. Conway a,*, G. J. b. Relation of Energies and Coverages of Underpotential and Overpotential Deposited H at Pt and Other Metals to the 'Volcano Curve' for Cathodic H2 Evolution Kinetics. *Electrochim. Acta* 2000, 45 (March), 4077-4083.

Moulder, J. F.; Stickle, W. F.; Sobol, P. E.; Bomben, K. D. *Handbook of X-Ray Photoelectron Spectroscopy*; Chastain, J., Ed.; Perkin-Elmer Corporation, 1992.

Nørskov, J. K.; Bligaard, T.; Logadottir, A.; Kitchin, J. R.; Chen, J. G.; Pandelov, S.; Stimming, U. Trends in the Exchange Current for Hydrogen Evolution. *J. Electrochem. Soc.* 2005, 152 (3), J23.

Oshchepkov, A. G.; Bonnefont, A.; Parmon, V. N.; Savinova, E. R. On the Effect of Temperature and Surface Oxidation on the Kinetics of Hydrogen Electrode Reactions on Nickel in Alkaline Media. *Electrochim. Acta* 2018, 269, 111-118.

Safizadeh, F.; Ghali, E.; Houlachi, G. Electrocatalysis Developments for Hydrogen Evolution Reaction in Alkaline Solutions—A Review. *Int. J. Hydrogen Energy* 2015, 40 (1), 256-274.

Selvaratnam, M. MECHANISM OF THE HYDROGEN-EVOLUTION REACTION ON NICKEL 1N ALKALINE SOLUTIONS BY THE DETERMINATION. *Trans. Faraday Soc.* 1960, 1820-1831.

Sheng, W.; Gasteiger, H. A.; Shao-Horn, Y. Hydrogen Oxidation and Evolution Reaction Kinetics on Platinum: Acid vs Alkaline Electrolytes. *J. Electrochem. Soc.* 2010, 157 (11), B1529.

Su, P.; Xiao, H.; Zhao, J.; Yao, Y.; Shao, Z.; Li, C.; Yang, Q. Nitrogen-Doped Carbon Nanotubes Derived from Zn—Fe—ZIF Nanospheres and Their Application as Efficient Oxygen Reduction Electrocatalysts with in Situ Generated Iron Species. *Chem. Sci.* 2013, 4 (7), 2941-2946.

Subbaraman, R.; Tripkovic, D.; Strmcnik, D.; Chang, K. C.; Uchimura, M.; Paulikas, a P.; Stamenkovic, V.; Markovic, N. M. Ivac)) given an Expected Mean Number of Events m 0=d 2 Np. *Science* (80-.). 2011, 334 (December), 1256-1260.

Subbaraman, R.; Tripkovic, D.; Strmcnik, D.; Chang, K. C.; Uchimura, M.; Paulikas, a P.; Stamenkovic, V.; Markovic, N. M. Ivac)) given an Expected Mean Number of Events m 0=d 2 Np. *Science* (80-.). 2011, 334 (December), 1256-1260.

Subbaraman, R.; Tripkovic, D.; Chang, K. C.; Strmcnik, D.; Paulikas, A. P.; Hirunsit, P.; Chan, M.; Greeley, J.; Stamenkovic, V.; Markovic, N. M. Trends in Activity for the Water Electrolyser Reactions on 3d M(Ni,Co,Fe,Mn) Hydr(Oxy)Oxide Catalysts. *Nat. Mater.* 2012, 11 (6), 550-557.

Tominaka, S.; Tang, J.; Ahamad, T.; Yamauchi, Y.; Zhang, H.; Salunkhe, R. R.; Ide, Y.; Malgras, V.; Kim, J. H.; Kobayashi, N.; et al. Bimetallic Metal-Organic Frameworks for Controlled Catalytic Graphitization of Nanoporous Carbons. *Sci. Rep.* 2016, 6 (1), 3-4.

Wang, J.; Mao, S.; Liu, Z.; Wei, Z.; Wang, H.; Chen, Y.; Wang, Y. Dominating Role of Ni0 on the Interface of Ni/NiO for Enhanced Hydrogen Evolution Reaction. *ACS Appl. Mater. Interfaces* 2017, 9 (8), 7139-7147.

Wang, J.; Xu, F.; Jin, H.; Chen, Y.; Wang, Y. Non-Noble Metal-Based Carbon Composites in Hydrogen Evolution Reaction: Fundamentals to Applications. *Adv. Mater.* 2017, 29 (14).

You, B.; Jiang, N.; Sheng, M.; Bhushan, M. W.; Sun, Y. Hierarchically Porous Urchin-Like Ni2P Superstructures Supported on Nickel Foam as Efficient Bifunctional Electrocatalysts for Overall Water Splitting. *ACS Catal.* 2016, 6 (2), 714-721.

Zhang, R.; Wang, X.; Yu, S.; Wen, T.; Zhu, X.; Yang, F.; Sun, X.; Wang, X.; Hu, W. Ternary NiCo2PxNanowires as PH-Universal Electrocatalysts for Highly Efficient Hydrogen Evolution Reaction. *Adv. Mater.* 2017, 29 (9).

Zhang, L.; Liu, P. F.; Li, Y. H.; Zu, M. Y.; Li, X.; Jiang, Z.; Wang, Y.; Zhao, H.; Yang, H. G. N-Modified NiO Surface for Superior Alkaline Hydrogen Evolution. *ChemSusChem* 2018, 11 (6), 1020-1024.

Zhou, X.; Yang, X.; Li, H.; Hedhili, M. N.; Huang, K. W.; Li, L. J.; Zhang, W. Symmetric Synergy of Hybrid CoS2-WS2 electrocatalysts for the Hydrogen Evolution Reaction. *J. Mater. Chem. A* 2017, 5 (30), 15552-15558.

Zhou, Z.; Mahmood, N.; Zhang, Y.; Pan, L.; Wang, L.; Zhang, X.; Zou, J. J. CoP Nanoparticles Embedded in P and N Co-Doped Carbon as Efficient Bifunctional Electrocatalyst for Water Splitting. *J. Energy Chem.* 2017, 26 (6), 1223-1230.

The invention claimed is:

1. A method of making a transition metal catalyst, the method comprising the steps of:
   (a) forming a slurry comprising carbon black particles and an aqueous solution comprising a salt of a transition metal M and an oxygen-containing chelating agent;
   (b) mixing the slurry, whereby the aqueous solution is absorbed by the carbon black particles;
   (c) separating the carbon black particles containing the absorbed solution from the non-absorbed solution;
   (d) drying the separated carbon black particles to obtain a solid product; and
   (e) heating the solid product, whereby a first portion of M is oxidized, a second portion of M is reduced to form nanoparticles comprising $M^o$, and a carbon matrix comprising graphene forms and surrounds the nanoparticles to form the catalyst.

2. The method of claim 1, wherein M is a 3d transition metal selected from the group consisting of scandium, titanium, vanadium, chromium, manganese, iron, cobalt, nickel, copper, zinc, and combinations thereof.

3. The method of claim 2, wherein M is nickel.

4. The method of claim 2, wherein the nanoparticles comprise $M:M_yO_x/C$, and wherein y is from 3-9 and x=(2y-1).

5. The method of claim 1, wherein the nanoparticles comprise $M:M_yO_x/C$, and wherein $1 \leq y \leq 3$ and $1 \leq x \leq 5$.

6. The method of claim 1, wherein the oxygen-containing chelating agent is selected from the group consisting of N-nitroso-N-phenylhydroxylamine (cupferron), ethylenediamine-tetraacetic acid, 2,3-dimercaptopropane-1-sulfonate, deferoxamine, nitrilo acetic acid, dimercaprol, meso-2,3-dimercaptosuccinic acid, and combinations thereof.

7. The method of claim 1, wherein the slurry formed in (a) comprises about 40 wt % of M, to which a solution of the oxygen-containing chelating agent is added dropwise.

8. The method of claim 1, wherein the slurry formed in (a) comprises M and the oxygen-containing chelating agent in a 1:2 molar ratio.

9. The method of claim 1, wherein the heating in (e) is performed at about 600° C. to 800° C.

10. The method of claim 1, wherein the heating of (e) is performed in an inert atmosphere.

11. The method of claim 1, wherein the nanoparticles formed in (e) further comprise an oxidized form of M.

12. The method of claim 11, wherein the nanoparticles formed in (e) comprise reduced and oxidized forms of M at an atomic ratio in the range from about 1:1 to about 1:3.

13. The method of claim 1, wherein the nanoparticles are each surrounded by from 1 to 5 layers of graphene.

14. The method of claim 1, wherein M in the final catalyst is prevented from contacting water when the catalyst is used in an aqueous environment.

15. The method of claim 1, wherein the final catalyst comprises from about 10% to about 70% of M (wt/wt) based on the total weight of the catalyst.

16. The method of claim 1, wherein the carbon black particles comprise microparticles and/or nanoparticles.

17. The method of claim 1, wherein the carbon black particles have a surface area of at least about 1000 $m^2/g$, at least about 1200 $m^2/g$, or at least about 1400 $m^2/g$.

18. The method of claim 1, wherein the method does not comprise use of a reducing agent.

19. A transition metal catalyst comprising a plurality of nanoparticles, wherein each nanoparticle comprises both reduced and oxidized forms of a transition metal M and is encased in one or more layers of graphene.

20. The transition metal catalyst of claim 19, wherein the catalyst is made by a method comprising the steps of:
   (a) forming a slurry comprising carbon black particles and an aqueous solution comprising a salt of a transition metal M and an oxygen-containing chelating agent;
   (b) mixing the slurry, whereby the aqueous solution is absorbed by the carbon black particles;
   (c) separating the carbon black particles containing the absorbed solution from the non-absorbed solution;
   (d) drying the separated carbon black particles to obtain a solid product; and
   (e) heating the solid product, whereby a first portion of M is oxidized, a second portion of M is reduced to form nanoparticles comprising $M^o$, and a carbon matrix comprising graphene forms and surrounds the nanoparticles to form the catalyst.

21. The transition metal catalyst of claim 19, wherein M is a 3d transition metal selected from the group consisting of scandium, titanium, vanadium, chromium, manganese, iron, cobalt, nickel, copper, zinc, and combinations thereof.

22. The transition metal catalyst of claim 21, wherein the nanoparticles comprise M:MyOx/C, and wherein y is from 3-9 and x=(2y−1).

23. The transition metal catalyst of claim 21, wherein the nanoparticles comprise M:MyOx/C, and wherein 1<y<3 and 1<x<5.

24. The transition metal catalyst of claim 19, wherein the nanoparticles comprise reduced and oxidized forms of M at an atomic ratio in the range from about 1:1 to about 1:3.

25. The transition metal catalyst of claim 19, wherein one or more oxidized forms of M are present at a surface of the nanoparticles.

26. The transition metal catalyst of claim 19, wherein each nanoparticle is encased in one to five layers of graphene.

27. The transition metal catalyst of claim 19, wherein the catalyst is suitable for catalyzing a hydrogen evolution reaction and/or an oxygen evolution reaction.

28. An electrode comprising the transition metal catalyst of claim 19.

* * * * *